United States Patent
Lee et al.

(10) Patent No.: US 10,912,111 B2
(45) Date of Patent: Feb. 2, 2021

(54) METHOD AND APPARATUS FOR TRANSMITTING REMAINING MINIMUM SYSTEM INFORMATION IN MULTIBEAM-BASED SYSTEM

(71) Applicant: Samsung Electronics Co., Ltd., Suwon-si (KR)

(72) Inventors: Namjeong Lee, Suwon-si (KR); Jaewon Kim, Seoul (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 15/970,767

(22) Filed: May 3, 2018

(65) Prior Publication Data

US 2018/0324843 A1    Nov. 8, 2018

(30) Foreign Application Priority Data

May 4, 2017    (KR) .................. 10-2017-0056831
Sep. 6, 2017   (KR) .................. 10-2017-0114152

(51) Int. Cl.
*H04W 72/12* (2009.01)
*H04W 48/04* (2009.01)
*H04W 48/12* (2009.01)
*H04L 5/00* (2006.01)
(Continued)

(52) U.S. Cl.
CPC ....... *H04W 72/1289* (2013.01); *H04L 5/0053* (2013.01); *H04W 48/04* (2013.01); *H04W 48/12* (2013.01); *H04W 48/16* (2013.01); *H04W 84/045* (2013.01)

(58) Field of Classification Search
CPC . H04W 72/1289; H04W 48/12; H04W 48/04; H04W 84/045; H04W 48/16; H04L 5/0053; H04L 1/0067; H04L 1/0071; H04L 5/0092; H04B 7/0695
See application file for complete search history.

(56) References Cited

U.S. PATENT DOCUMENTS

2016/0006547 A1    1/2016  Kang et al.
2016/0087695 A1    3/2016  Wang
(Continued)

OTHER PUBLICATIONS

International Search Report dated Aug. 17, 2018 in connection with International Patent Application No. PCT/KR2018/005158, 3 pages.
(Continued)

*Primary Examiner* — Vinncelas Louis

(57) ABSTRACT

The present disclosure relates to a pre-5th-Generation (5G) or 5G communication system for supporting higher data rates Beyond 4th-Generation (4G) communication system such as Long Term Evolution (LTE). The present disclosure includes an operation method of a terminal in a wireless communication system, the method including checking information on at least one control resource set carrying scheduling information for scheduling remaining system information based on a master information block (MIB) received from a base station, checking the scheduling information in the at least one control resource set, and receiving the remaining system information based on the scheduling information.

12 Claims, 29 Drawing Sheets

(51) Int. Cl.
*H04W 48/16* (2009.01)
*H04W 84/04* (2009.01)

(56) References Cited

U.S. PATENT DOCUMENTS

| | | | |
|---|---|---|---|
| 2016/0174251 A1* | 6/2016 | Zhang | H04B 7/2656 370/280 |
| 2016/0286555 A1 | 9/2016 | Papasakellariou | |
| 2018/0098361 A1* | 4/2018 | Ji | H04L 45/00 |
| 2018/0287734 A1* | 10/2018 | Lee | H04L 1/0067 |
| 2019/0059075 A1* | 2/2019 | Hayashi | H04L 5/0092 |
| 2019/0306847 A1* | 10/2019 | Seo | H04W 72/046 |
| 2019/0356524 A1* | 11/2019 | Yi | H04B 7/0695 |
| 2020/0092946 A1* | 3/2020 | Xiong | H04L 1/0071 |

OTHER PUBLICATIONS

Qualcomm Incorporated, "Remaining system information delivery consideration", 3GPP TSG-RAN WG1 #88bis, Apr. 3-7, 2017, 2 pages, R1-1705569.

Guangdong OPPO Mobile Telecom, "Discussion on the remaining system information delivery", 3GPP TSG RAN WG1 Meeting 88 bis, Apr. 3-7, 2017, 2 pages, R1-1704603.

CATT, "Discussion on QCL for NR", 3GPP TSG RAN WG1 Meeting #88bis, Apr. 3-7, 2017, 3 pages, R1-1704567.

* cited by examiner

FIG. 24

| Antenna port | OCC in odd OFDM symbol | OCC in even OFDM symbol |
|---|---|---|
| # 0 | [+1 +1] | [+1 +1] |
| # 1 | [+1 −1] | [−1 +1] |

METHOD AND APPARATUS FOR TRANSMITTING REMAINING MINIMUM SYSTEM INFORMATION IN MULTIBEAM-BASED SYSTEM

CROSS-REFERENCE TO RELATED APPLICATIONS AND CLAIM OF PRIORITY

This application is based on and claims priority under 35 U.S.C. § 119 to Korean Patent Application No. 10-2017-0056831 filed on May 4, 2017 and to Korean Patent Application No. 10-2017-0114152 filed on Sep. 6, 2017 in the Korean Intellectual Property Office, the disclosures of which are incorporated herein by reference in their entireties.

BACKGROUND

1. Field

The present disclosure relates to operations of a base station and a terminal for transmitting remaining minimum system information (RMSI), which constitutes minimum system information in a multibeam-based system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Meanwhile, the essential information for performing a random access in a 5G system may be defined as minimum system information (SI). The minimum system information may consist of master information block (MIB) and remaining minimum system information (RMSI), and there is a need of a method for transmitting the RMSI.

SUMMARY

The present disclosure has been conceived to solve the above problem and aims to provide operations of a base station and a terminal for transmitting the RMSI in a multibeam-based system. Also, the present disclosure aims to provide operations of a base station and a terminal for transmitting RMSI transmission channel (RMSI being transmitted in physical downlink shared channel (PDSCH) scheduling information via the MIB and downlink control channel information (DCI).

In accordance with an aspect of the present disclosure, a method of a terminal in a wireless communication system is provided. The method includes checking information on at least one control resource set carrying scheduling information for scheduling remaining system information based on a master information block (MIB) received from a base station, checking the scheduling information in the at least one control resource set, and receiving the remaining system information based on the scheduling information.

In accordance with another aspect of the present disclosure, a method of a base station in a wireless communication system is provided. The method includes transmitting a master information block (MIB) including information on at least one control resource set carrying scheduling information for scheduling remaining system information, transmitting the scheduling information in the at least one control resource set, and transmitting the remaining system information based on the scheduling information.

In accordance with another aspect of the present disclosure, a terminal in a wireless communication system is provided. The terminal includes a transceiver configured to transmit and receive signals and a controller configured to control to check information on at least one control resource set carrying scheduling information for scheduling remaining system information based on a master information block received from a base station, checking the scheduling information in the at least one control resource set, and receiving the remaining system information based on the scheduling information.

In accordance with still another aspect of the present disclosure, a base station in a wireless communication system is provided. The base station includes a transceiver configured to transmit and receive signals and a controller configured to control to transmit a master information block (MIB) including information on at least one control resource set carrying scheduling information for scheduling remaining system information, transmit the scheduling information in the at least one control resource set, and transmit the remaining system information based on the scheduling information.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 24 is a diagram illustrating a table with OCC mapping per antenna port;

DETAILED DESCRIPTION

Figure 1:
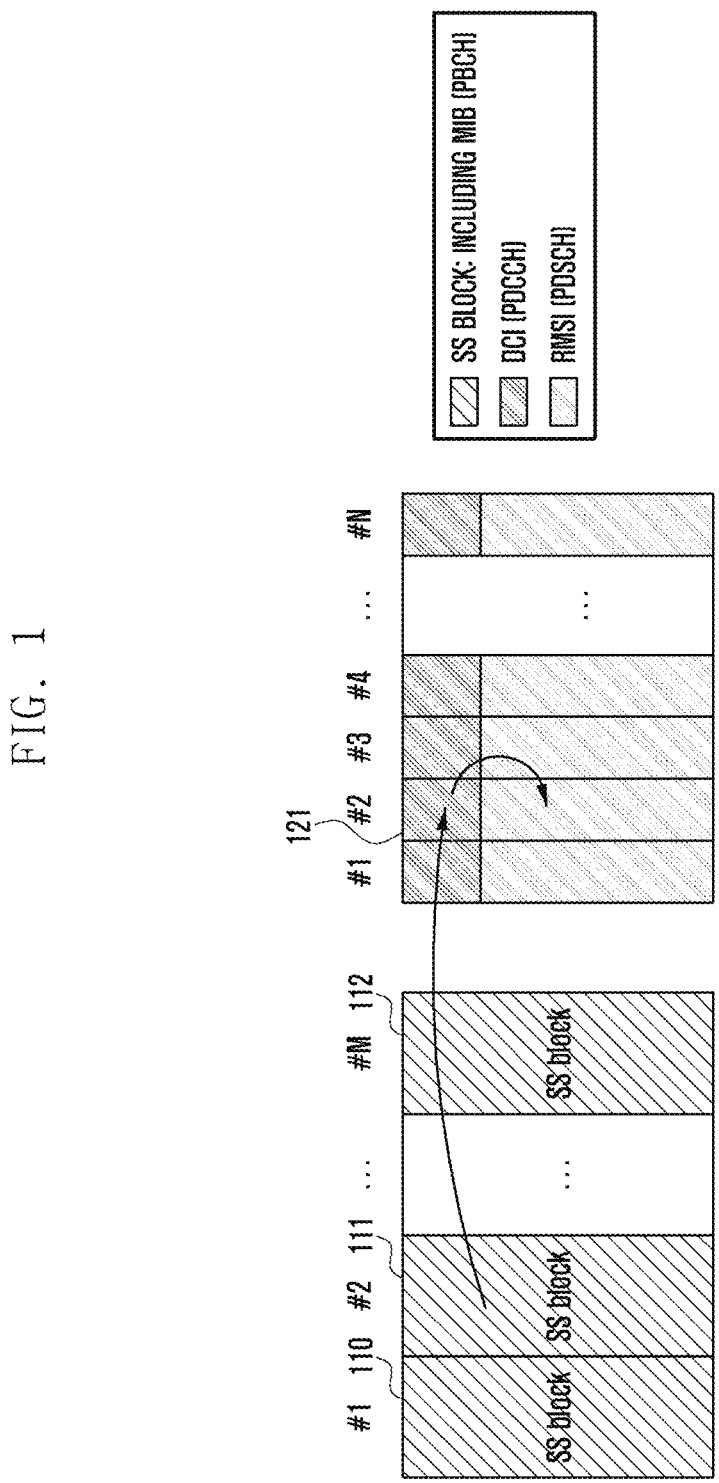
FIG. 1 is a diagram illustrating a resource configuration for explaining an overall operation of a terminal for receiving RMSI according to an embodiment of the present disclosure.

FIGS. 1 through 29, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Various embodiments of the present disclosure are described in detail with reference to the accompanying drawings. Detailed descriptions of well-known functions and structures incorporated herein may be omitted to avoid obscuring the subject matter of the present disclosure. Further, the following terms are defined in consideration of the functionality in the present disclosure, and they may vary according to the intention of a user or an operator, usage, etc. Therefore, the definition should be made on the basis of the overall content of the present specification.

Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will be defined by the appended claims. Like reference numerals refer to like elements throughout the specification.

In a new radio access technology (new RAT) system (NR system), the system information (SI) broadcast to terminals may be divided into minimum system information (minimum SI) and other system information (other SI). The minimum SI that is minimally required for a terminal to perform random access (RA) is delivered to all users or terminals within a cell. The minimum SI is broadcast to all terminals. The other system SI includes information excepting the minimum system information.

The minimum SI may consist of the information included in the MIB and RMSI.

The MIB is transmitted on a new radio-physical broadcast channel (hereinafter, referred to as NR-PBCH or just PBCH), and the RMSI is transmitted on a new radio-physical downlink shared channel (hereinafter, referred to as NR-PDSCH or just PDSCH). The scheduling information for scheduling the PDSCH carrying the RMSI may be transmitted via the MIB and DCI, and the information on the new radio-physical downlink control channel (hereinafter, referred to as NR-PDCCH or just PDCCH) carrying the DCI is transmitted via the MIB. In the present disclosure, it is assumed that the minimum SI is transmitted in a multibeam sweeping scheme in order for the minimum SI to be delivered to all users within a cell.

There is therefore a need of a method for transmitting the information on the PDCCH carrying the DCI via the MIB and a method for transmitting the scheduling information for the PDSCH carrying the RMSI via the DCI.

FIG. 1 is a diagram illustrating a resource configuration for explaining an overall operation of a terminal for receiving RMSI according to an embodiment of the present disclosure.

As shown in FIG. 1, the terminal may acquire time-frequency resource position information of a control resource set (CORESET) for receiving a control information scheduling RMSI Tx PDSCH (hereinafter, referred to as RMSI-related CORESET) via a PBCH in synchronization signal (SS) blocks 110, 111, and 112. Here, the SS blocks may be configured to include resources for transmitting synchronization signals and a PBCH for transmitting the MIB. The CORESET denotes a resource region for a terminal to search for in order to acquire control information, and the terminal can decode the DCI by searching the CORESET.

In this way, the terminal can acquire information on the RMSI-related CORESET, search the RMSI-related CORESET to acquire control information for RMSI Tx PDSCH scheduling, and decode the RMSI Tx PDSCH based on the control information.

Here, the RMSI-related CORESET may be configured to transmit the DCI for scheduling the RMSI Tx PDSCH only or along with DCIs for other purposes.

The SS blocks may carry a primary synchronization signal (PSS), an secondary synchronization signal (SSS), a PBCH, and a demodulation reference signal (DMRS) for decoding the PBCH. It is assumed that the second SS block 111 among M SS blocks indicates the CORESET mapped to the second one of total N RMSI-related CORESET positions. The terminal may receive the second CORESET 121 among the total N RMSI-related CORESETs using the same terminal beam as that used for receiving the second SS block 111 among the M SS blocks. That is, as shown in FIG. 1, the terminal may use the same terminal beam for receiving a specific SS block and the CORESET (or RMSI) indicated in the specific SS block, under the assumption that the base station uses the same transmission beam to transmit a specific CORESET (or RMSI) indicated in the specific SS Block.

The RMSI-related CORESET and PDSCH may be multiplexed in the same manner as shown in FIG. 1 or in a different manner. The subcarrier spacing (SCS) for transmitting the SS blocks may be identical with or different from the SCS for transmitting the RMSI-related CORESET and/or PDSCH, and the SCS for transmitting the RMSI-related CORESET and the SCS for transmitting the RMSI Tx PDSCH may be identical with or different from each other.

[RMSI Scheduling]

The aforementioned MIB being transmitted through the PBCH may include information on the RMSI-related CORESET(s). The PBCH may include information on the PDSCH carrying the RMSI in part as well as the information on the RMSI-related CORESET(s).

There may be 1) an RMSI-related CORESET having its resource position (e.g., search space) which the terminal has to perform decoding to determine in a CORESET based on the received SS blocks or 2) RMSI-related CORESETs existing independently which the terminal has to perform decoding based on the received SS blocks. For the case of the independently existing CORESETs which the terminal has to perform decoding, a set of RMSI-related CORESETs is configured.

For example, a CORESET may comprises multiple OFDM symbols (e.g., 30 OFDM symbols), and the base station may transmit RMSI scheduling information through beam sweeping in one CORESET. Accordingly, the terminal may perform decoding at specific resource positions within a CORESET based on the SS blocks to acquire control information, and the resource positions for which the terminal searches to decode the control information may be referred to as search space in a CORESET.

In the case where multiple CORESETs on which the terminal has to perform blind decoding exist independently, the terminal may locate the positions of the CORESETs on which the terminal has to perform decoding based on the SS blocks and then perform decoding thereon.

As described above, it may be possible to configure one or more RMSI-related CORESETs. The configuration information for the RMSI-related CORESET in the MIB may include at least part of the information listed as follows, and some information may be predefined in the standard.

1) Subcarrier spacing or numerology of RMSI-related CORESET (s) and cyclic prefix (CP) length (normal CP or extended CP)

A base station may transmit a terminal subcarrier spacing of RMSI-related CORESET(s) or numerology, subcarrier spacing or numerology of an RMSI Tx PDSCH, and CP length. The subcarrier spacing of the RMSI-related CORESET(s) and the subcarrier spacing of the RMSI Tx PDSCH may be identical with each other and, in this case, the MIB may indicate just one subcarrier spacing.

Or, the base station may not include the above information in the MIB and, in this case, it may be specified that the subcarrier spacing of the RMSI Tx PDSCH and/or the CP length are identical with each other in the standard. In the present disclosure, the expression "transmitting a channel such as PBCH" may mean transmitting information through the channel.

2) DCI aggregation level (AL)

Similar to that in an LTE system, the RMSI scheduling information (DCI) being carried in the RMSI-related CORESET may be transmitted using one or more control channel elements (CCEs), and the base station may send the terminal an aggregation level indicating the number of aggregated CCEs.

3) Band

A band may be expressed with a number of physical resource blocks (PRBs). This information may be band information for RMSI-related CORESET(s) or band information for RMSI-related CORESET(s) and a PDSCH. The band may be composed of non-consecutive PRBs.

Meanwhile, the band information may include an indicator indicating a start position, a middle position, or an end position of multiple PRBs allocated in association with the frequency position information to be described later.

4) Frequency position information of RMSI-related CORESET(s)

The MIB may include frequency domain information associated the positions of RMSI-related CORESET(s). The MIB may also include information on the positions of DCI for scheduling RMSI in the CORESET(s). Here, the RMSI-related DCI information may be transmitted with or without other DCI information in the CORESET(s).

Meanwhile, the frequency domain information of the CORESET(s) may include the positions of the CORESET(s) in a minimum carrier bandwidth (BW) or the positions of the CORESET(s) in a PBCH BW. In the case where the system BW information is transmitted in the MIB, the system BW information may include the positions of the CORESET(s).

If the frequency domain information of the CORESET(s) is provided as positions in the minimum carrier BW or PBCH BW, the base station may send the terminal the frequency domain information of the CORESET(s) as follows.

Alt 1. The base station may send the terminal the frequency domain information using the offset between the center frequency of the CORESET(s) and the center frequency of the terminal-received SS block(s).

Alt 2. The base station may notify the terminal of the frequency domain information using the information of the offset between the starting or ending point of the CORESET(s) in the frequency domain and the center frequency of the SS block(s).

Alt. 3. The base station may send the terminal the frequency domain information of the CORESET(s) using the information on the positions of CORESET(s) in the minimum carrier BW or PBCH BW (e.g., starting RB number or RB number associated with the center frequency of the CORESET(s). Here, the CORESET position information may be an offset value or RB information as described above or a value selected among a few candidate values designated in the standard.

If the frequency domain information of the CORESET(s) is provided in the form of the positions in the system BW, the base station may send the terminal the frequency domain information of the CORESET(s) in a method as follows.

Alt 1. The base station may send the terminal the frequency domain information of the CORESET(s) using the offset between the center frequency of the CORESET(s) and the center frequency of the terminal-received SS block(s).

Alt 2. The base station may send the terminal the frequency domain information of the CORESET(s) using the offset between the starting or ending point of the CORESET(s) in the frequency domain.

Alt 3. The base station may send the terminal the frequency domain information of the CORESET(s) using the position of the CORESET(s) in the system BW (e.g., starting RB number or RB number associated with the center frequency of the CORESET(s)). Here, the position of the CORESET(s) may be the offset value or RB information as described above or a value selected among a few candidate values designated in the standard.

In the case of transmitting the frequency domain information of the CORESET(s) in the scheme of Alt 3, the system BW should be carried in the MIB.

5) Starting position in time domain (time domain starting point) and periodicity of the RMSI-related CORESET(s)

The starting position information (time domain starting point) of the RMSI-related CORESET(s) may denote the starting time point of the CORESET(s). For example, this information may be configured to include the information indicating a subframe (SF) or a slot from which the CORESET(s) start in a radio frame. The starting position information may also be configured to include the information indicating a subframe or an OFDM symbol from which the CORESET(s) start. The starting position information may also be configured to include the information on a radio frame number, a fixed subframe number, or a slot number and an OFDM symbol number in the subframe or slot from which the CORESET(s) start. The base station may also transmit information on a parameter that is not fixed among the radio frame number, subframe number, and slot number.

In the case of configuring the periodicity of the RMSI-related CORESET(s), the periodicity may be designated as a multiple of 20 ms equal to the default SS periodicity that is assumed by a user in initial cell access. For example, if the multiple is 2 (or 10 in binary), the periodicity of the RMSI-related CORESET(s) becomes 40 ms.

The starting position and periodicity of the RMSI-related CORESET(s) may be equal to the starting position of the periodicity of the RMSI Tx PDSCH. In this case, the starting position and periodicity information of the RMSI-related CORESET(s) may not be included in the MIB. The information indicating that the starting position and periodicity of the RMSI-related CORESET(s) are equal to the starting position and periodicity of the RMSI Tx PDSCH may be carried in the MIB.

6) SS burst set periodicity information
An SS burst set is composed of multiple SS blocks. For example, it may be possible to aggregate the SS blocks #1 to #M into an SS burst set in FIG. 1. The SS blocks may be mapped into the SS burst set contiguously or not. Although a terminal assumes the SS burst set periodicity of 20 ms in initial access, the network may configure the periodicity of the SS burst set of the terminal via UE-specific RRC signaling (UE is the acronym for user equipment, which corresponds to terminal in the present disclosure).

7) System beam-related information (information indicating single beam-based system or multibeam-based system)
This information may be a 1-bit indicator included in the MIB or analogized from the information on the number of SS blocks being actually transmitted in an SS burst set "actual # of SS blocks in an SS burst set". For example, if the number of SS blocks in an SS burst set is 1, the terminal may assume that the corresponding system is a single beam-based system; if the number of SS blocks in an SS burst set is greater than 1, the terminal may assume that the corresponding system is a multibeam-based system.

8) Quasi-colocation (QCL) information (e.g., QCL between MIB transmission beam and DCI transmission beam) (1 bit)
This information may indicate whether the terminal can assume a QCL relationship between the PSS/SSS in an SS block or PBCH DMRS and the PDCCH DMRS carried in the RMSI-related CORESET corresponding to the SS block. This information is a 1-bit indicator, and the terminal assumes a non-QCL relationship with this indicator set to "0" and a QCL relationship with this indicator set to "1."

If QCL is configured, this means that the transmission (Tx) beam used for a specific SS block is identical with the Tx beam used for a search space or a CORESET in specific RMSI-related CORESET(s). Accordingly, the base station may transmit an indicator indicating whether QCL exists between beams or between reference signals and, if QCL is configured, the terminal may notice the beam for the RMSI-related CORESET or search space in the CORESET based on the base station Tx beam for the SS block.

If QCL is not configured, this means that the above-described relationship is not fulfilled and, in this case, the blind decoding count of the terminal may increase.

9) Number of mini-slots configured with search spaces within a CORESET or configured with of a CORESET and PDSCH)
A mini-slot may mean the smallest possible scheduling unit. A mini-slot may consist of one OFDM symbol and may be configured to carry at least one of control and data channels.

Here, the information on the number of mini-slots may indicate a number of search spaces being transmitted on different beams within a CORESET or a number of CORESETs constituting a CORESET group. This information may also be configured to indicate a number of mini-slots being transmitted on different beams in a PDSCH. This information may be configured to indicate a number of mini-slots including search spaces within a CORESET or including both the CORESET and PDSCH.

If the "actual # of SS blocks in an SS burst set" information is transmitted or QCL is provided between PSS/SSS or PBCH DMRS in the SS block and the PDCCH DMRS of the CORESET, it may not be necessary to configure this information in the MIB. This is because the terminal can notice the beam for transmitting the RMSI-related CORESET or the search spaces in the CORESET based on the base station Tx beam carrying the SS block.

If a mini-slot denotes a unit including the search spaces in a CORESET or including both the CORESET and PDSCH, it may not be necessary to configure the information of 14) to be described later in the MIB in so far as this information is configured in the MIB.

10) Number of OFDM symbols in one mini-slot
If one CORESET is configured for RMSI, this information may be interpreted as "number of OFDM symbols constituting one search space within one CORESET."

Or, if multiple CORESETs corresponding to SS block(s) are configured for RMSI, this information may be interpreted as "number of OFDM symbols constituting one CORESET."

Or, if a mini-slot includes both the CORESET and PDSCH, this information may indicate a number of OFDM symbols for transmitting the CORESET and PDSCH. Accordingly, this information may indicate a monitoring periodicity of the search spaces within one CORESET or CORESETs. In this case, it may not be necessary to configure the information of 14) to be described later in the MIB.

11) ON/OFF information indicating presence/absence of RMSI-related CORESET(s) or PDSCH transmission (1 bit)
This information indicates presence/absence of an RMSI-related CORESET or PDSCH transmission and may be replaced by the RMSI-related CORESET or PDSCH periodicity information (in this case, if the periodicity-related parameter=0, this may mean the absence of the RMSI-related CORESET or PDSCH (OFF).

12) System BW
If system BW is configured in the MIB, the RMSI-related PDCCH and PDSCH may be freely scheduled in the frequency domain within the system BW. If the system BW is not configured in the MIB, the RMSI-related PDCCH and PDSCH transmission may be limited to the minimum carrier BW (or minimum system BW), and the transmission frequency position may be fixed.

13) QCL mapping information
If only one CORESET is configured for RMSI, the QCL mapping information indicates how many SS blocks are associated with one search space within the CORESET. For example, if the QCL relationship is 1:1, this means that the number of search spaces within a CORESET is equal to the number of SS blocks that are actually transmitted.

If an RMSI-related CORESET group is configured, the QCL mapping information indicates how many SS blocks are associated with one core set. For example, if the QCL relationship is 1:1, this means that the total number of CORESETs is equal to the number of SS blocks that are actually transmitted.

Meanwhile, the QCL information of 8) and the QCL mapping information of 13) may be configured in various manners. For example, if the QCL mapping information is configured, this means that QCL exists; thus, the QCL information may not be configured.

It may also be possible to configure only the QCL information to indicate whether QCL exists by preconfiguring the QCL mapping information.

It may also be possible to configure the QCL information and the QCL mapping information with a predetermined number of bits collectively. For example, it may be possible to use 2-bit information, which is set to 00 indicative of no QCL configuration, 01 indicative of the QCL configuration with the relationship of 1:1, 10 indicative of the QCL configuration with the relationship of 1:2, and 11 indicative of the QCL configuration with the relationship of 1:3.

14) CORESET time position information (position information of search spaces associated with SS blocks in one CORESET or mapping information of a CORESET associated with SS blocks in one CORESET group)

The CORESET time position information may indicate the positions of individual search spaces in the time domain in one CORESET along with the QCL relationship information.

This information may also be configured to indicate how the CORESETs constituting a CORESET group are mapped in the time domain along with the QCL relationship information. This information may indicate the positions of the CORESETs in a slot carrying the configuration for RMSI-related CORESET transmission. For example, each CORESET may be mapped to consecutive or non-consecutive OFDM symbols in a slot.

As aforementioned, the CORESET time position information indicates how the search spaces of a CORESET or the CORESETs are mapped in the time domain and may be referred to as CORESET mapping information.

In particular, if the CORESET is mapped to non-consecutive symbols, this information may be used to indicate the position of the CORESET. For example, the base station may indicate the starting point of the CORESET via the aforementioned CORESET starting position information and then the OFDM symbol position (time domain) mapped to the CORESET via the CORESET mapping information using bit information. For example, the bit information may indicate the number of symbols that are not mapped to the CORESET or an index of a predetermined CORESET mapping pattern.

Using the above-described CORESET, the base station provides the terminal with RMSI Tx PDSCH scheduling information. The terminal may identify information on the CORESET configured in the MIB, and acquire scheduling information for the RMSI Tx PDSCH to which the RMSI is to be transmitted. The information contained in the DCI carried by RMSI-related CORESET(s) may include at least one of following pieces of information, and some of the information may be predefined in the standard.

1) RMSI payload size
2) MCS
3) Subcarrier spacing
If the corresponding information is not configured in the MIB, it may be configured in DCI.
4) Band
A band may be indicated by a number of PRBs. This information may be the band information for RMSI Tx PDSCH or band information for mini-slots including RMSI-related CORESET(s) or a PDSCH.
5) Frequency position information of RMSI Tx PDSCH
The frequency position of an RMSI Tx PDSCH may be identical or not identical with the frequency position of the CORESET configured in the MIB. The base station may send a terminal 1-bit of information to notify the terminal whether the RMSI Tx PDSCH frequency position is identical with the CORESET frequency position.

If the RMSI Tx PDSCH frequency position differs from the CORESET frequency position, the base station may send the terminal the RMSI Tx PDSCH frequency position information. The RMSI Tx PDSCH frequency position information is transmitted to the terminal in the same manner as the CORESET frequency position information; thus a detailed description of how to transmit the RMSI Tx PDSCH frequency position information is omitted herein.

6) Starting position of RMSI Tx PDSCH in time domain (time domain starting point) and periodicity In the MIB, this information may indicate whether the time domain position of the RMSI Tx PDSCH is identical with the time domain position of the CORESET. If the time domain positions differ from each other, information indicating by how many slots the RMSI Tx PDSCH position is delayed in comparison with the slot including the CORESET position is configured in the MIB.

7) SS burst set (SS burst set) periodicity
If this information is not configured in the MIB, the base station may send the terminal the SS burst set periodicity information using DCI.

8) System beam-related information (information indicating single beam-based system or multibeam-based system)

This information may be configured in the form of a 1-bit indicator in DCI or analogized from the "number of SS blocks being actually transmitted in an SS burst set (actual # of SS blocks in an SS burst set)." For example, if the number of SS blocks being actually transmitted in an SS burst set is 1, the terminal may assume that the corresponding system is a single beam-based system; if the number of SS blocks being actually transmitted in an SS burst set is greater than 1, the terminal may assume that the corresponding system is a multibeam-based system.

9) QCL information (e.g., QCL between MIB transmission beam and DCI transmission beam) (1 bit)

This information may indicate QCL between an MIB or DCI Tx beam and RMSI Tx beam. The information on the QCL between the MIB or DCI Tx beam and the RMSI Tx beam may be referred to as inter-beam QCL. Here, the information on the QCL between the MIB Tx beam and the DCI Tx beam and the information on the QCL between the MIB or DCI Tx beam and the RMSI Tx beam may be referred to as first and second inter-beam QCL information, respectively.

If QCL is configured between the MIB Tx beam (PBCH DMRS) and RMSI Tx beam (DMRS in RMSI Tx PDSCH), this means that the base station Tx beam for transmitting a certain SS block is identical with a beam for transmitting a certain RMSI Tx PDSCH. Accordingly, the base station may transmit an indicator indicating whether QCL is configured between beams or between reference signals and, if QCL is configured, the terminal may notice the beam for transmitting RMSI Tx PDSCH based on the base station Tx beam for transmitting the SS block.

If QCL is not configured, this means that the above-described relationship is not fulfilled and, in this case, the blind decoding count of the terminal may increase.

10) Number of mini-slots (number of mini-slots configured with PDSCH)

A mini-slot may mean the smallest possible scheduling unit. A mini-slot may consist of one OFDM symbol and may be configured to carry at least one of control and data channels.

Here, the information on the number of mini-slots may indicate a number of mini-slots being transmitted on different beams in a PDSCH. If the "actual # of SS blocks in an SS burst set" information is transmitted or QCL is provided between PSS/SSS or PBCH DMRS in the SS block and the DMRS of RMSI Tx PDSCH, it may not be necessary to configure this information in the DCI. This is because the terminal can notice the beam for transmitting the RMSI Tx PDSCH based on the base station Tx beam for transmitting the SS block.

11) Number of OFDM symbols in one mini-slot

If this information is not configured in the MIB or if it is designed that the CORESET and PDSCH are transmitted in different mini-slots, this information may be configured in DCI.

The above-described RMSI-related CORESET or PDSCH Tx mini-slots may be configured in various manners, and the information being configured in the MIB and DCI and RMSI reception (Rx) operation of a terminal vary depending on the configuration of the mini-slot.

As described above, a mini-slot means the smallest possible scheduling unit and may indicate a unit of search space in a CORESET, a unit of CORESET transmission, a unit of RMSI transmission, or a unit of a search space or a CORESET with PDSCH transmission. Detailed descriptions thereof are made hereinafter.

Figure 2:
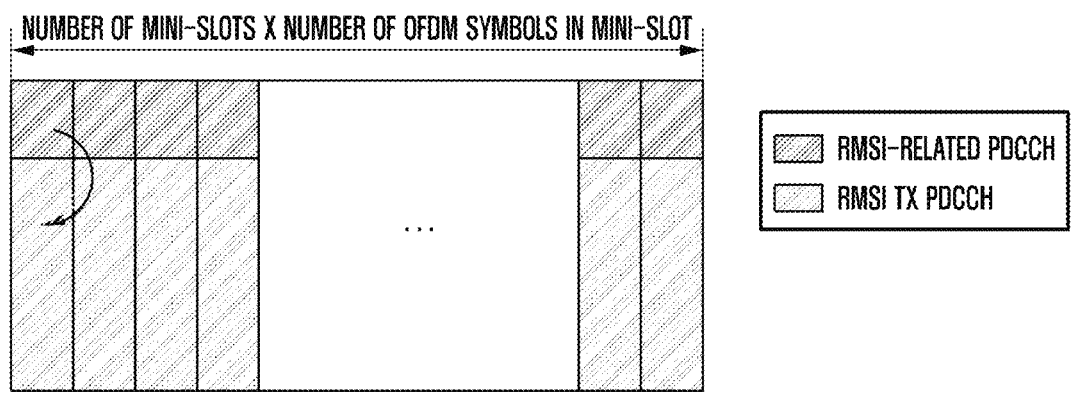
FIG. 2 is a diagram illustrating a configuration of mini-slots according to an embodiment of the present disclosure.

FIG. 2 is a diagram illustrating a configuration of mini-slots according to an embodiment of the present disclosure.

FIG. 2 exemplifies RMSI-related CORESET or PDSCH Tx mini-slots.

In reference to FIG. 2, the RMSI-related CORESET and PDSCH are identical in periodicity, and the CORESET and PDSCH periodicity information may be configured in the MIB. Here, the CORESET and PDSCH may be transmitted in the same mini-slots, and the mini-slot periodicity may be configured in the MIB. Here, the periodicity information may mean a monitoring periodicity information.

A number of mini-slots for transmitting the RMSI-related CORESET and PDSCH (or total number of CORESETs) and a number of OFDM symbols per mini-slot may be configured in the MIB. The CORESET may be transmitted in some of the OFDM symbols per mini-slot.

In FIG. 2, the CORESET and PDSCH are frequency division multiplexed (FDMed) in every OFDM symbol of the mini-slots carrying both the CORESET and PDSCH.

Figure 3:
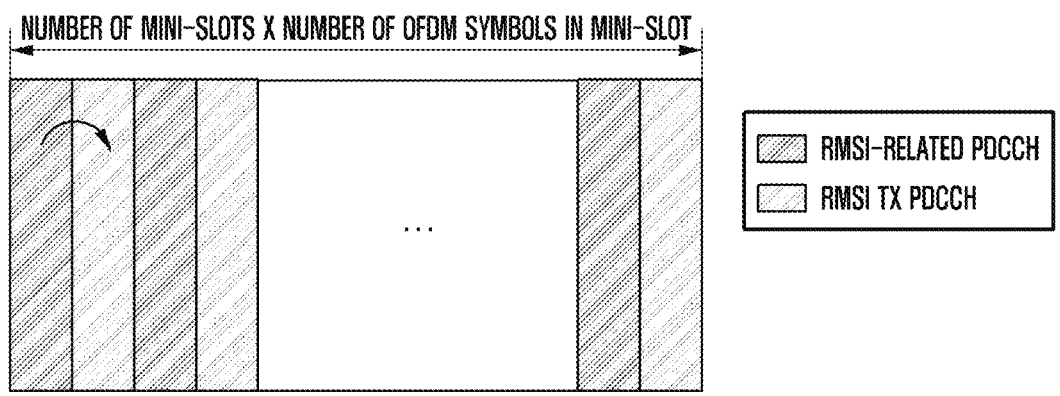
FIG. 3 is a diagram illustrating a configuration of mini-slots according to another embodiment of the present disclosure.

FIG. 3 is a diagram illustrating a configuration of mini-slots according to another embodiment of the present disclosure.

In the embodiment FIG. 3, the RMSI-related CORESET and PDSCH are identical in periodicity, and the periodicity information of the CORESET and PDSCH is configured in the MIB. Here, each mini-slot may be configured to carry one of the CORESET and PDSCH.

A number of mini-slots for transmitting the RMSI-related CORESET and PDSCH (or total number of CORESETs) and a number of OFDM symbols per mini-slot may be configured in the MIB. Here, the CORESET may be transmitted in some of the OFDM symbols constituting a mini-slot. It may also be possible to configure the number of OFDM symbols for transmitting the CORESET per mini-slot in the MIB and the number of OFDM symbols for transmitting the PDSCH in the DCI.

Figure 4:
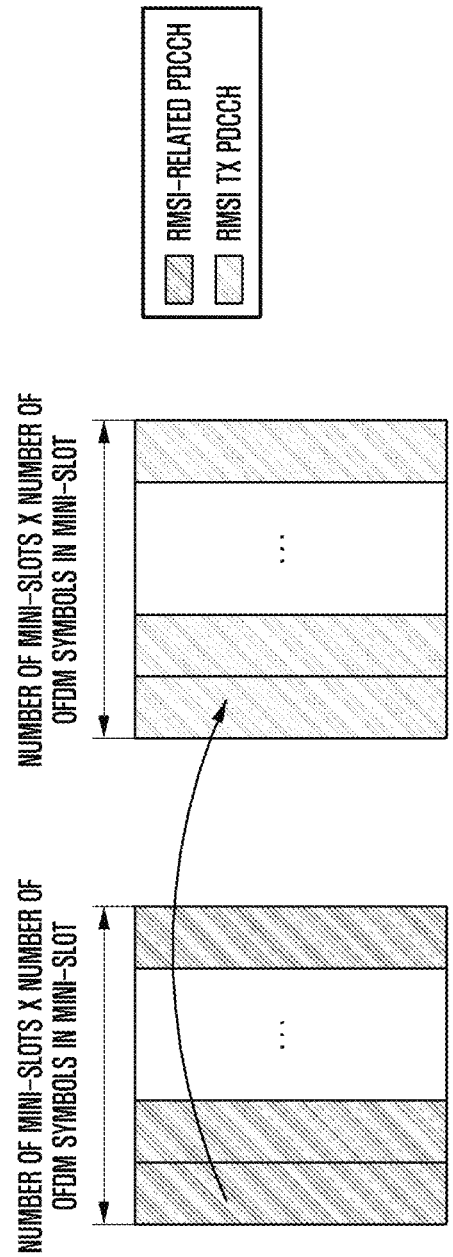
FIG. 4 is a diagram illustrating a configuration of mini-slots according to another embodiment of the present disclosure.

FIG. 4 is a diagram illustrating a configuration of mini-slots according to another embodiment of the present disclosure.

In the embodiment of FIG. 4, the RMSI-related CORESET and PDSCH may not be identical in periodicity. The CORESET periodicity information may be configured in the MIB, and the PDSCH periodicity information may be configured in the DCI. In the embodiment of FIG. 4, a mini-slot may be designed to carry search spaces constituting a CORESET, a CORESET, or a PDSCH.

A number of mini-slots for transmitting the RMSI-related search spaces or CORESET and PDSCH may be configured in the MIB, or the number of mini-slots for transmitting the PDSCH may be configured in the DCI. A number of OFDM symbols for transmitting the search spaces or CORESET and PDSCH per mini-slot may be configured in the MIB, or only a number of OFDM symbols corresponding to the search spaces or each CORESET may be configured in the MIB while the number of OFDM symbols for transmitting the PDSCH may be configured in the DCI.

[PDCCH/PDSCH Time Domain Position and Periodicity Configuration]

Figure 5:
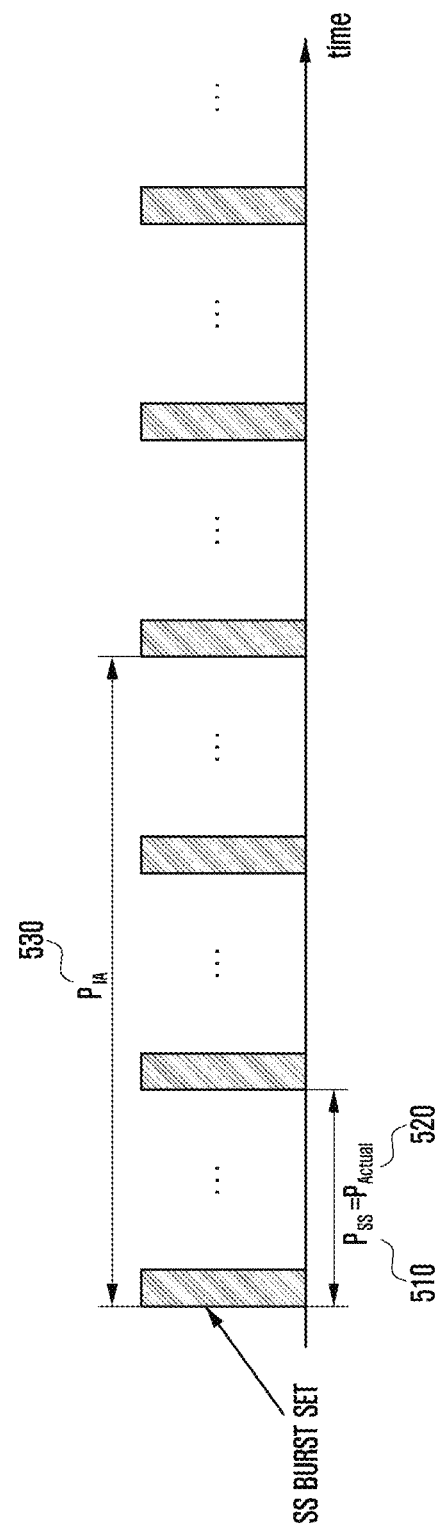
FIG. 5 is a diagram illustrating an SS burst set transmission method according to an embodiment of the present disclosure.
Figure 6:
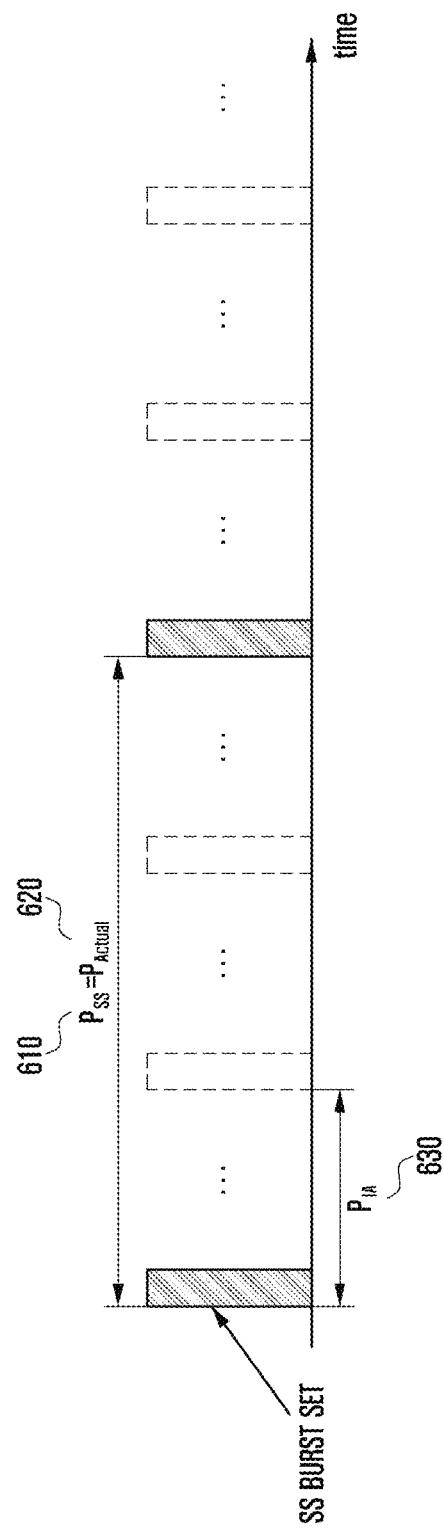
FIG. 6 is a diagram illustrating an SS burst set transmission method according to an embodiment of the present disclosure.
Figure 7:
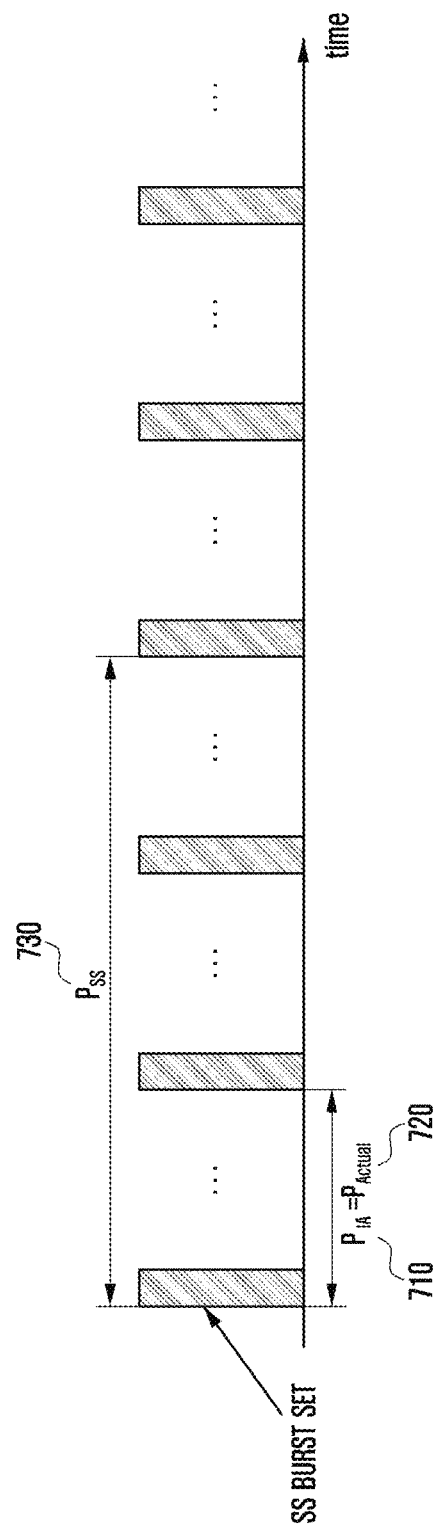
FIG. 7 is a diagram illustrating an SS burst set transmission method according to an embodiment of the present disclosure.

The RMSI-related CORESET time domain starting position and periodicity information may be configured in the MIB, and the RMSI Tx PDSCH time domain position information may be configured in the MIB or DCI. In order to explain the PDCCH/PDSCH Tx time domain position and periodicity information configuration, cases for a base station to transmit SS burst sets are depicted in FIGS. 5, 6, and 7.

A terminal may assume the SS burst set transmission periodicity differently depending on its operation state (e.g., initial access, CONNECTED, and IDLE state). For example, a terminal attempting initial access assumes the SS burst set transmission periodicity of 20 ms.

The base station may configure an SS burst set periodicity that is different from that assumed in the initial access procedure to the terminal in the CONNECTED state (CONN terminal) such that the terminal receives the SS burst set according to the SS burst set periodicity configured by the base station. The base station may set the SS burst set periodicity to one of 5, 10, 20, 40, 80, and 160 ms.

A terminal in the IDLE state (IDLE terminal) may, if necessary, use the SS burst set periodicity configured when it has connected to the network or attempt to receive the SS burst set according to the SS burst set periodicity configured for initial access.

FIGS. 5 to 7 show SS burst set transmission schemes in various cases as aforementioned. In the drawings, $P_{IA}$ denotes the default SS burst set periodicity for initial access, and $P_{SS}$ denotes the SS burst set periodicity configured by the base station (for CONN and/or IDLE user). $P_{Actual}$ denotes the SS burst set periodicity at which the base station actually transmits the SS burst set (for CONN and/or IDLE user).

FIG. 5 is a diagram illustrating an SS burst set transmission method according to an embodiment of the present disclosure.

As shown in FIG. 5, the base station-configured SS burst set periodicity $P_{SS}$ 510 is equal to the actual SS burst set transmission periodicity $P_{Actual}$ 520 of the base station. The base station-configured SS burst set periodicity $P_{SS}$ 510 may be less than the default SS burst set periodicity for initial access $P_{IA}$ 530.

In this case, the terminal may receive the SS burst set at a periodicity shorter than the default SS burst set periodicity according to the configuration provided by the base station.

FIG. 6 is a diagram illustrating an SS burst set transmission method according to an embodiment of the present disclosure.

As shown in FIG. 6, the base station-configured SS burst set periodicity $P_{SS}$ 610 is equal to the actual SS burst set transmission periodicity $P_{Actual}$ 620 of the base station. The base station-configured SS burst set periodicity $P_{SS}$ 610 may be greater than the default SS burst set periodicity for initial access $P_{IA}$ 630.

In this case, the terminal may receive the SS burst set at a periodicity longer than the default SS burst set periodicity according to the configuration provided by the base station.

FIG. 7 is a diagram illustrating an SS burst set transmission method according to an embodiment of the present disclosure.

As shown in FIG. 7, the default SS burst set periodicity for initial access $P_{IA}$ 710 is equal to the actual SS burst set transmission periodicity $P_{Actual}$ 720 of the base station. The actual SS burst set transmission periodicity $P_{Actual}$ 720 may be less than the base station-configured SS burst set periodicity $P_{SS}$ 730.

In this case, the base station may transmit the SS burst set at the default SS burst set periodicity for initial access while the terminal may receive the SS burst set at a periodicity longer than the actual SS burst set transmission periodicity $P_{Actual}$ 720.

Meanwhile, the time domain starting position of the RMSI-related CORESET(s) described with reference to FIG. 4 and the CORESET(s) or PDSCH described with reference to FIGS. 2 and 3 may be fixed, and fixing the time domain starting position may contribute to an information bit saving effect in the MIB or DCI. That is, if the CORESET or PDSCH starting time point is fixed, there is no need to configure the starting position information in the MIB or DCI.

In order to fix the CORESET or PDSCH starting time position, it may be possible to assume that the CORESET(s) of FIG. 4 or the CORESET(s) or PDSCH of FIGS. 2 and 3 are transmitted in $J^{th}$ slot of +$k^{th}$ frame in association with the frame in which the SS burst set carrying the last PBCH during the last PBCH transmission time interval (TTI) starts being transmitted.

In the case where the mini-slots are configured as shown in FIG. 4, the PDSCH transmission position may be fixed in association with the CORESET(s) transmission starting time point. It may also be possible to fix the CORESET(s) transmission starting time point or CORESET(s) or PDSCH transmission staring time position to an absolute time point. For example, it may be assumed to start transmission at the $J^{th}$ slot in the radio frame with a number that makes it possible to obtain an R value when mod is taken with Y.

In the case of fixing the transmission position of the CORESET(s) or CORESET(s)/PDSCH, the CORESET(s) or reference point of the CORESET(s)/PDSCH recognized by the terminal may be one of the following:

Alt 1. Transmission starting time point of SS burst set carrying last PBCH in PBCH TTI calculated based on max($P_{SS}$) value Alt 2. Transmission starting time point of SS burst set carrying last PBCH in PBCH TTI calculated based on $P_{IA}$ value Alt 3. Transmission starting time point of SS burst set carrying last PBCH in PBCH TTI calculated based on $P_{SS}$ value (or $P_{Actual}$ value) configured in MIB Alt 4. Initial access terminal: transmission starting time point of SS burst set carrying last PBCH in PBCH TTI calculated based on $P_{IA}$ value CONN/IDLE terminal: transmission starting time point of SS burst set carrying last PBCH in PBCH TTI calculated based on $P_{SS}$ value In the case of Alt 4, the actual CORESET(s) or CORESET(s)/PDSCH transmission time point of the base station is calculated based on min ($P_{IA}$, $P_{SS}$) value.

It may also be possible to fix the CORESET(s) or CORESET(s)/PDSCH transmission time point to an absolute CORESET(s) transmission position as well as to fix the CORESET(s) or CORESET(s)/PDSCH transmission time point based on the PBCH TTI as in Alt 1 to 4. For example, the RMSI-related CORESET(s) or CORESET(s) or PDSCH) may start being transmitted at the $U^{th}$ slot in a frame fulfilling mod (SFN, 5)=0.

Meanwhile, the PBCH TTI may be referenced when configuring the periodicity of the RMSI-related CORESET(s) of FIG. 4 or the CORESET(s)/PDSCH or PDSCH of FIGS. 2 and 3. For example, it may be assumed that the CORESET(s), CORESET(s)/PDSCH, or PDSCH is transmitted at the position designated as above every L PBCH TTIs. L may be configured in the MIB for the case of configuring the periodicity of the RMSI-related CORESET(s) or CORESET(s)/PDSCH or in the DIC for the case of configuring the periodicity of the RMSI-related PDSCH. The PBCH TTI value assumed by the terminal may be one of the following:

Alt 1. PBCH TTI calculated based on max($P_{SS}$) value

Alt 2. PBCH TTI calculated based on $P_{IA}$ value

Alt 3. PBCH TTI calculated based on $P_{SS}$ value (or $P_{Actual}$ value) configured in the MIB The PBCH TTI is a time interval providing the same PBCH content transmission and, if it transmits the same PBCH content during the Q consecutive SS burst sets, the PBCH TTI corresponds to the time interval of "reference periodicity value (ms)×Q."

The CORESET(s), CORESET(s)/PDSCH, or PDSCH transmission periodicity may be set to an absolute periodicity value as well as being configured based on the PBCH TTI calculated as one of Alt 1 to 3. For example, it may be possible to select the RMSI-related CORESET(s), CORESET(s)/PDSCH, or PDSCH periodicity value from {40, 80, 160, 320 ms} defined in the standard and configure a 2-bit information indicating the selected value.

It may also be possible to reference the default SS periodicity (20 ms) assumed by the terminal in initial access when configuring the RMSI-related CORESET(s) of FIG. 4 or CORESET(s)/PDSCH or PDSCH periodicity of FIGS. 2 and 3.

[RMSI Application Timing after Receipt of RMSI]

In a multibeam-based system, beam sweeping is performed for complete coverage of a cell in which all terminals can receive a cell-specific signal, and the MIB and RMSI are representative information broadcast to the terminal through beam sweeping. Through beam sweeping, the same MIB and RMSI are transmitted on different directional beams. Each terminal may receive signals on some or all of the sweeping beams. Accordingly, the same RMSI may be received by the terminals at different timings; thus, although the RMSI is received on different directional beams, the RMSI should be applied at the same timing. In particular, because the RMSI is directly scheduled in the CORESET, the terminal may not know the absolute start time point of the RMSI transmitted through beam sweeping.

The timing for applying the RMSI received by the terminal may be designated according to one of the following methods.

Alt 1. Configuring information on a radio frame, subframe, and slot for applying RMSI in the RMSI Alt 2. Configuring reference position (radio frame number, subframe number, slot number, etc.) in the RMSI and applying the RMSI at a radio frame/subframe/slot after offset (+Q) since the default position. Here, the offset value may be transmitted to the terminal in the MIB, RMSI, or DCI or predetermined in the terminal.

Alt 3. Applying the RMSI at the start time point of a radio frame after an offset, i.e., the +$Q^{th}$ radio frame, based on the radio frame from which transmission of the RMSI-related CORESET starts. Here, the offset value may be transmitted to the terminal in the MIB or DCI or preconfigured in the terminal.

Alt 4. Applying the RMSI at the start point of a radio frame after an offset, i.e., the +Qth radio frame, from the radio frame in which the RMSI-related CORESET transmission starts. Here, the offset value (Q) may be configured in the RMSI.

Alt 5. Apply the RMSI at the transmission time point of a new SS burst set on the basis of the default SS periodicity (20 ms) assumed by the terminal in an initial transmission after an RMSI TTI assumed by the terminal.

Hereinafter, descriptions are made of the aforementioned RMSI scheduling information configured in the MIB and DCI and mini-slot design according to various embodiments.

One embodiment is directed to the case where mini-slots are configured as shown in FIG. 2 such that the CORESET(s) and PDSCH periodicity is determined based on $P_{SS}$. In this embodiment, the description is made of a case where there is no need for the terminal to perform blind decoding on search spaces in the RMSI-related CORESET or CORESET and PDSCH. That is, the description is made of the case where the QCL information is set to ON. Here, the QCL information is a 1-bit indicator set to ON.

This embodiment is directed to a case where a mini-slot configured to search spaces or both the CORESET and PDSCH. In this embodiment, a QCL relationship of 1:1 exists between the PSS/SSS or PBCH DMRS in an SS block and the PDCCH DMRS in the search spaces/CORESET.

Figure 8:
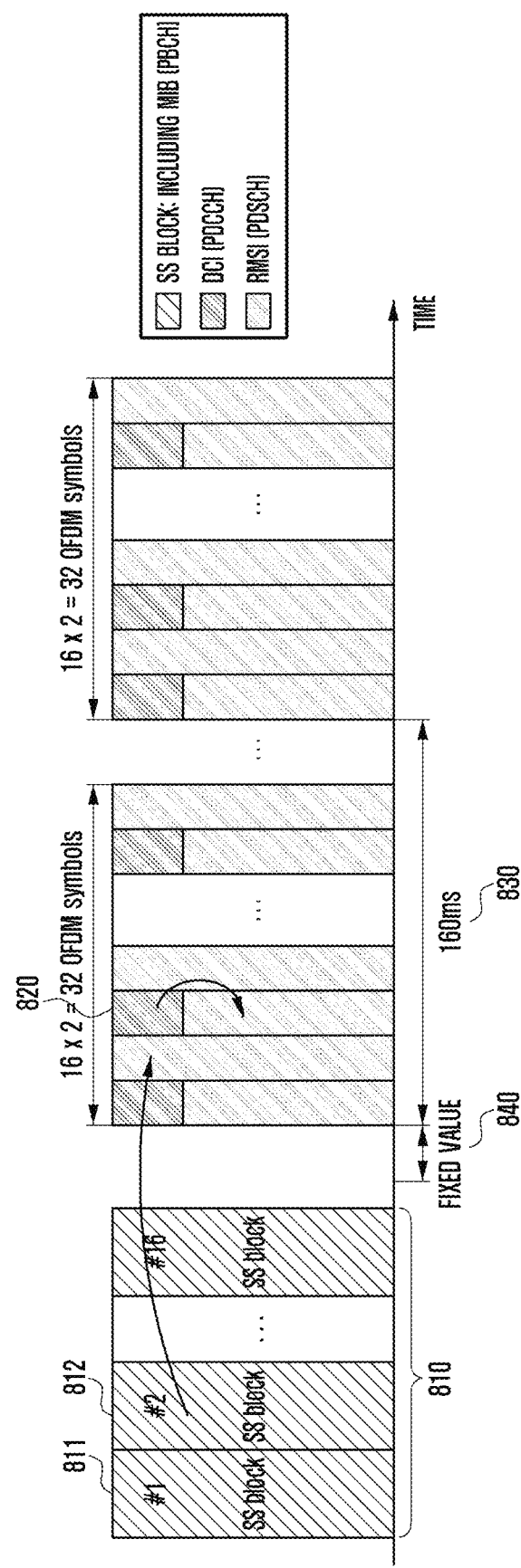
FIG. 8 is a diagram illustrating a resource configuration for transmitting SS burst sets, RMSI-related CORESETs, and PDSCH according to an embodiment of the present disclosure.

FIG. 8 is a diagram illustrating a resource configuration for transmitting SS burst sets, RMSI-related CORESETs, and PDSCH according to an embodiment of the present disclosure.

In reference to FIG. 8, an SS burst set 810 may consist of 16 SS blocks. Here, it is assumed that the first SS block 811 starts being transmitted at the first OFDM symbol in the frame in which the SS burst set transmission starts. It may transmit the same PBCH content for 4 consecutive SS burst sets and that the corresponding position becomes the frame starting point corresponding to the transmission starting point of the fourth SS burst set. However, the present disclosure is not limited to this embodiment.

The terminal may locate the starting point of the frame carrying the SS burst sets upon receipt of an SS block (based on PBCH or TSS in the SS block) and, if the standard specifies that the RMSI-related CORESET(s) transmission position is fixed ("fixed value" 840 in FIG. 8), analogizes the starting point of the RMSI-related CORESET(s) from the starting point of the corresponding frame.

If the position of the CORESET is fixed, the starting point of the CORESET may be fixed at an absolute position or determined based on an offset from the starting point of the frame carrying the SS burst set. If the starting point of the CORESET is fixed, an indicator indicating the starting time point of the CORESET may be transmitted to the terminal in the MIB or DCI.

For example, if the starting point of the CORESET is fixed at an absolute position, the system frame index, subframe index, slot index, and symbol index may be predetermined, or part of the information may be transmitted to the terminal in the MIB or DCI. It may also be possible that an offset from the starting point of the frame carrying the SS burst set is preconfigured in the terminal or transmitted to the terminal in the MIB or DCI.

In this case, a parameter indicating the number of SS blocks constituting an SS burst set may be set to 16 in the MIB, and the terminal may determine that the corresponding system is a multibeam-based system based on this information.

It may be possible that the QCL information or QCL parameter (QCL between the PSS/SSS or PBCH DMRS in the SS block and the RMSI-related PDCCH DMRS in this embodiment) is set to ON (i.e., Quasi-colocation exists).

It may be possible that a mini-slot is configured to have two OFDM symbols. In this case, it may be possible to analogize the position of a search space or CORESET based on the beam on which the terminal has received the SS block (including PBCH). This is because the base station Tx beam for transmitting a specific SS block is identical with the beam for transmitting the corresponding search space or CORESET in a situation where QCL is configured.

In reference to FIG. 8, if the terminal receives the second SS block 812 in the SS burst set, it may receive the DCI in the second CORESET. Because one mini-slot consists of 2 OFDM symbols, the terminal may receive the DCI including the RMSI scheduling information transmitted at the third OFDM symbol 820 counted from the RMSI-related search space of the CORESET transmission starting time point (based on the QCL relationship).

If the network-configured SS burst set periodicity is 40 ms and the RMSI-related CORESET(s)/PDSCH periodicity L is set to 1 under the assumption that the transmission of the same PBCH is provided for 4 consecutive SS burst sets in the standard, the transmission periodicity becomes 160 ms (=40 ms×4×1), as denoted by reference number 830, based on the RMSI-related CORESET(s)/PDSCH starting point.

However, part of the information may be configured in the DCI. Although the description has been made with specific kinds of information, various other kinds of information may be configured in the MIB and DCI.

Figure 9:
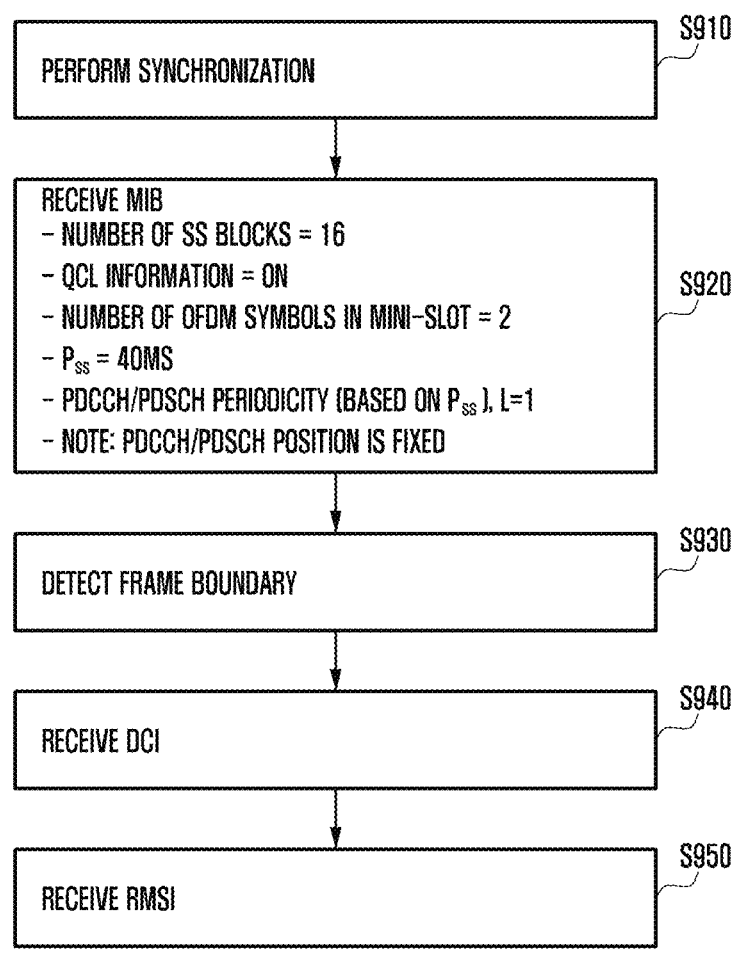
FIG. 9 is a flowchart illustrating an operation of a terminal according to an embodiment of the present disclosure.

FIG. 9 is a flowchart illustrating an operation of a terminal according to an embodiment of the present disclosure.

In reference to FIG. 9, the terminal may perform synchronization at step S910. The synchronization may be performed based on the PSS and SSS received from a base station.

The terminal may receive the MIB through a PBCH at step S920. The terminal may obtain the CORESET information from the MIB and receive RMSI scheduling information (DCI) in the CORESET.

Here, the number of SS blocks constituting the SS burst set may be set to 16 in the MIB and, on the basis of this information, the terminal may determine that the corresponding system is a multibeam-based system.

The MIB may include QCL information or a QCL parameter set to ON.

It may be possible that the number of OFDM symbols constituting one mini-slot is set to 2. In this case, the terminal may analogize the position of a search space or CORESET for receiving signals based on the beam on which the SS block (including PBCH) is received. The detailed description thereof has been described above and thus is omitted herein.

It may be possible that the SS burst set periodicity is set to 40 ms and the RMSI-related CORESET(s)/PDSCH periodicity L is set to 1 in the MIB. Because the same content can be transmitted for 4 consecutive SS burst sets in the standard, the terminal may assume that the transmission periodicity is 160 ms (=40 ms×4×1) based on the RMSI-related CORESET(s)/PDSCH starting point.

The MIB may also include the information indicating that a PDCCH or PDSCH position is fixed.

However, part of the above information may be transmitted in the DCI. Although the description is made with specific kinds of information, various other kinds of information may be configured in the MIB and DCI.

At step S930, the terminal may detect the frame boundary based on the information contained in the MIB. That is, the terminal may locate a radio frame starting point based on the information carried in the MIB. The terminal may obtain the information on the CORESET position and CORESET periodicity based on the PBCH or TSS.

The terminal may receive the DCI at step S940. In detail, the terminal may receive the DCI for scheduling RMSI at the identified CORESET position.

Then, the terminal may receive the RMSI at step S950. That is, the terminal may receive the RMSI in the PDSCH resources identified based on the DCI.

Figure 10:
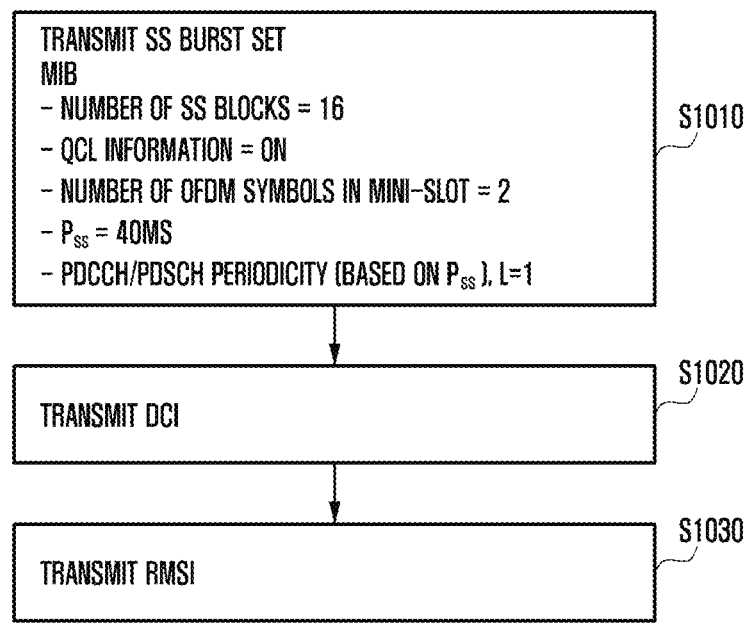
FIG. 10 is a flowchart illustrating an operation of a base station according to an embodiment of the present disclosure.

FIG. 10 is a flowchart illustrating an operation of a base station according to an embodiment of the present disclosure.

In reference to FIG. 10, the base station may transmit an SS burst set at step S1010. The SS burst set may include the PSS, SSS, TSS, and MIB.

The MIB may also include the information on the CORESET, and the base station may send the terminal the RMSI scheduling information (DCI) in the CORESET.

The detailed description of the information being included in the MIB has been made above with reference to FIG. 9 and thus is omitted herein.

Next, the base station may transmit the DCI at step S1020. In detail, the base station may transmit the DCI including the RMSI scheduling information at the designated CORESET position.

Then, the base station may transmit the RMSI at step S1030. The base station may transmit the RMSI in the PDSCH resources indicated by the RMSI scheduling information.

Various embodiments are directed to the cases where the mini-slots are configured as shown in FIG. 2 such that the CORESET(s)/PDSCH periodicity is determined based on $P_{SS}$. These embodiments are directed to instances where the terminal has to perform blind decoding to receive RMSI-related PDCCH and PDSCH. That is, the QCL information may not be configured or set to OFF in these embodiments. Here, the QCL information is a 1-bit indicator set to OFF.

These embodiments are directed to cases where a mini-slot is configured to search spaces or both the CORESET and PDSCH.

In various embodiments, an SS burst set consists of 16 SS blocks as shown in FIG. 8. The terminal may locate the starting point of a frame carrying the SS burst set upon receipt of an SS block (based on the PBCH or TSS in the SS block) and, if the standard specifies that the RMSI-related CORESET(s) transmission position is fixed ("fixed value" in FIG. 10), analogizes the starting point of the RMSI-related CORESET(s) from the starting point of the corresponding frame.

Figure 11:
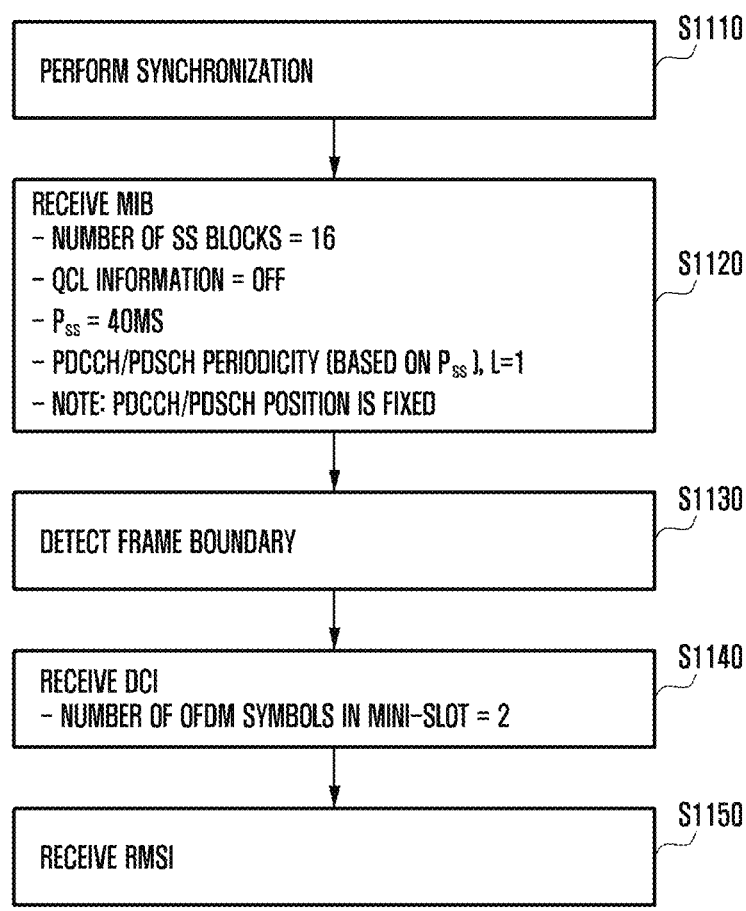
FIG. 11 is a flowchart illustrating an operation of a terminal according to an embodiment of the present disclosure.

FIG. 11 is a flowchart illustrating an operation of a terminal according to an embodiment of the present disclosure.

In reference to FIG. 11, the terminal may perform synchronization at step S1110. The synchronization may be performed based on the PSS and SSS received from the base station.

Next, the terminal may receive the MIB through a PBCH at step S1120. The terminal may obtain CORESET information from the MIB and receive RMSI scheduling information (DCI) in the corresponding CORESET.

Here, the number of SS blocks constituting the SS burst set may be set to 16 in the MIB and, on the basis of this information, the terminal may determine that the corresponding system is a multibeam-based system.

It may be possible that the QCL information or QCL parameter (QCL between the PSS/SSS or PBCH DMRS in the SS block and the RMSI-related PDCCH DMRS) is set to OFF (i.e., Quasi-colocation does not exist). Accordingly, the terminal cannot analogize the position of a search space or CORESET just based on the beam on which the terminal has received the SS block (including PBCH). In this case, it may be necessary to perform blind decoding to decode the DCI from the RMSI-related CORESET(s) starting time point during the CORESET(s)/PDSCH periodicity at the most. In the case of the single beam-based system, of course, the corresponding DCI is transmitted at the RMSI-related CORESET(s) transmission starting time point and thus there is no need for the terminal to perform blind decoding continuously.

If the network-configured SS burst set periodicity is 40 ms and the RMSI-related CORESET(s)/PDSCH periodicity L is set to 1 under the assumption that the transmission of the same PBCH is provided for 4 consecutive SS burst sets in the standard, the transmission periodicity becomes 160 ms (=40 ms×4×1) based on the RMSI-related CORESET(s)/PDSCH starting point.

However, part of the information may be configured in the DCI. Although the description has been made with specific kinds of information, various other kinds of information may be configured in the MIB and DCI.

At step S1130, the terminal may detect the frame boundary based on the information carried in the MIB. That is, the terminal may locate a radio frame starting point based on the information carried in the MIB. The terminal may obtain the information on the CORESET position and CORESET periodicity based on the PBCH or TSS.

The base station may receive the DCI at step S1140. In detail, the terminal may receive the DCI for scheduling the RMSI at the identified CORESET position.

On the basis of the DCI, the terminal may obtain the information on the number of the OFDM symbols for use in transmitting the RMSI and identify the PDSCH transmission resources with the exception of the resources occupied by the PDCCH in the band carrying the RMSI-related search spaces or CORESET and PDSCH within a mini-slot. On the basis of the above information, the RMSI payload can be transmitted from the corresponding resource and the code rate according to the RMSI payload can also be determined. In this embodiment, the number of OFDM symbols for transmitting the RMSI in a mini-slot may be set to 2.

Meanwhile, if the number of SS blocks constituting the SS burst set is set to 1, this means that the corresponding system is a single beam-based system and thus the terminal can decode the DCI at the RMSI-related CORESET transmission position without necessity of performing a blind decoding.

Figure 12:
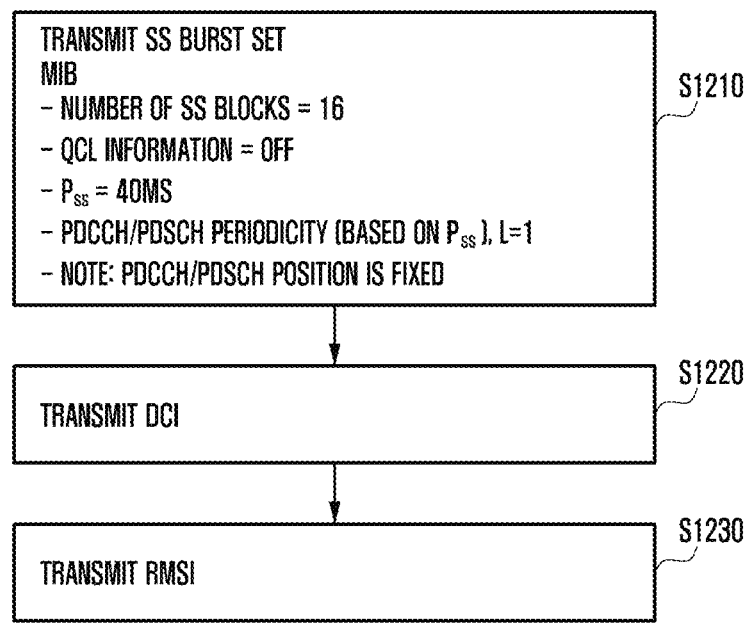
FIG. 12 is a flowchart illustrating an operation of a base station according to an embodiment of the present disclosure.

FIG. 12 is a flowchart illustrating an operation of a base station according to an embodiment of the present disclosure.

In reference to FIG. 12, the base station may transmit an SS burst set at step S1210. The SS burst set may include the PSS, SSS, TSS, and MIB.

The MIB may include the information on the CORESET, and the base station may send the terminal the RMSI scheduling information (DCI) in the CORESET.

The detailed description of the information being included in the MIB has been made above with reference to FIG. 11 and thus is omitted herein.

Next, the base station may transmit the DCI at step S1220. In detail, the base station may transmit the DCI including the RMSI scheduling information at the designated CORESET position. As described above, the DCI may include the information on the number of OFDM symbols for use in transmitting the RMSI.

Finally, the base station may transmit the RMSI at step S1230. The RMSI may be transmitted in the PDSCH resources indicated by the RMSI scheduling information.

Figure 13:
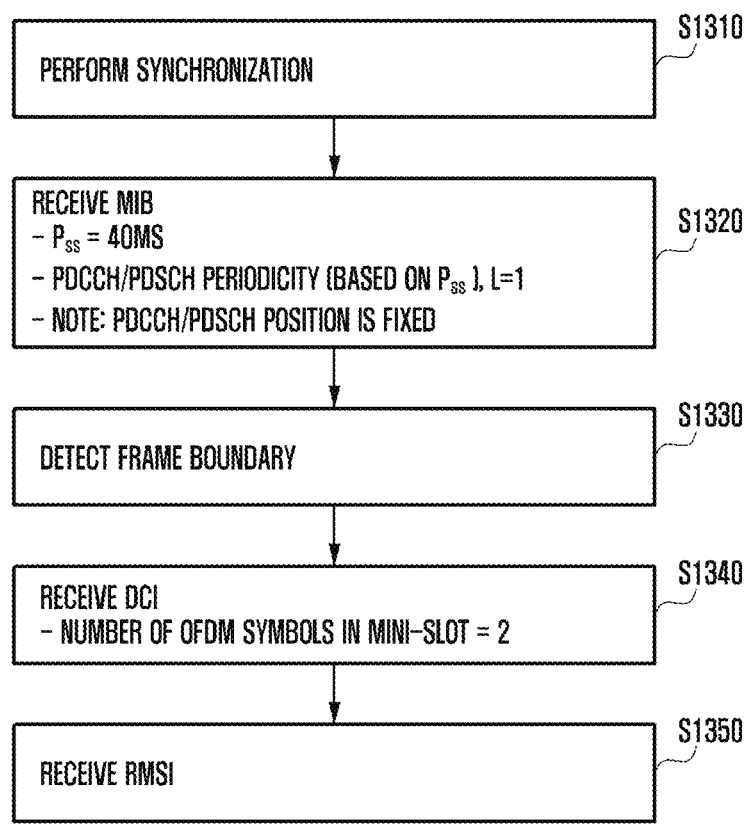
FIG. 13 is a flowchart illustrating an operation of a terminal according to an embodiment of the present disclosure.

FIG. 13 is a flowchart illustrating an operation of a terminal according to an embodiment of the present disclosure.

In reference to FIG. 13, the terminal may perform synchronization at step S1310. The synchronization may be performed based on the PSS and SSS received from a base station.

The terminal may receive the MIB through a PBCH at step S1320. The terminal may obtain the CORESET information from the MIB and receive RMSI scheduling information (DCI) in the CORESET.

The MIB may not include a parameter indicating the number of SS blocks constituting the SS burst set and a parameter indicating whether the corresponding system is a single beam-based system or a multibeam-based system. Accordingly, every terminal has to perform blind decoding to decode the DCI from the CORESET(s) transmission starting position before the next period. The MIB may also include no QCL information.

It may be possible that the SS burst set periodicity is set to 40 ms and the RMSI-related CORESET(s)/PDSCH periodicity L is set to 1 in the MIB. Because the same content can be transmitted for 4 consecutive SS burst sets in the standard, the terminal may assume that the transmission periodicity is 160 ms (=40 ms×4×1) based on the RMSI-related CORESET(s)/PDSCH starting point.

However, part of the above information may be transmitted in the DCI. Although the description is made with specific kinds of information, various other kinds of information may be configured in the MIB and DCI.

On the basis of the information obtained from the MIB, the terminal may detect the frame boundary at step S1330. That is, the terminal may locate a radio frame starting point based on the information carried in the MIB. The terminal may obtain the information on the CORESET position and CORESET periodicity based on the PBCH or TSS.

Next, the terminal may receive the DCI at step S1340. In detail, the terminal may receive the DCI for scheduling the RMSI at the identified CORESET position.

On the basis of the DCI, the terminal may obtain the information on the number of the OFDM symbols for use in transmitting the RMSI and identify the PDSCH transmission resources with the exception of the resources occupied by search spaces or a CORESET in the band carrying the RMSI-related search spaces or CORESET and PDSCH within a mini-slot. On the basis of the above information, the RMSI payload can be transmitted from the corresponding resource and the code rate according to the RMSI payload can also be determined. In this embodiment, the number of OFDM symbols for transmitting the RMSI in a mini-slot may be set to 2.

Figure 14:
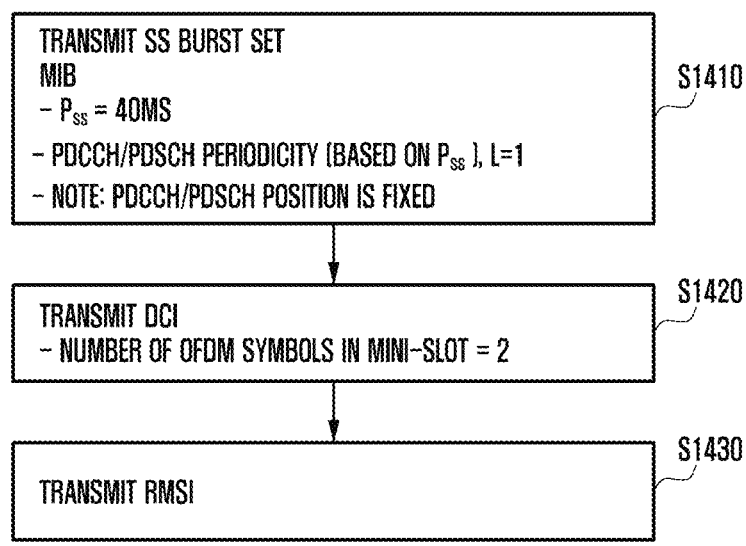
FIG. 14 is a flowchart illustrating an operation of a base station according to an embodiment of the present disclosure.

FIG. 14 is a flowchart illustrating an operation of a base station according to an embodiment of the present disclosure.

In reference to FIG. 14, the base station may transmit an SS burst set at step S1410. The SS burst set may include the PSS, SSS, TSS, and MM.

The MIB may include the information on the CORESET, and the base station may send the terminal the RMSI scheduling information (DCI) in the CORESET.

The detailed description of the information being included in the MIB has been made above with reference to FIG. 13 and thus is omitted herein.

Next, the base station may transmit the DCI at step S1420. In detail, the base station may transmit the DCI including the RMSI scheduling information at the designated CORESET position. As described above, the DCI may include the information on the number of OFDM symbols for use in transmitting the RMSI.

Finally, the base station may transmit the RMSI at step S1430. The RMSI may be transmitted in the PDSCH resources indicated by the RMSI scheduling information.

An embodiment is directed to the case where the mini-slots are configured as shown in FIG. 4 such that the CORESET(s) and PDSCH periodicities are determined based on $P_{SS}$. The embodiment is directed to a case where there is no need for the terminal to perform blind decoding to receive RMSI-related CORESET(s) and PDSCH. That is, the QCL information is set to ON in this embodiment. Here, the QCL information is a 1-bit indicator set to OFF.

In this embodiment, it is assumed that a QCL relationship of 1:1 exists between the PSS/SSS or PBCH DMRS in the SS block and the PDSCH DMRS.

Figure 15:
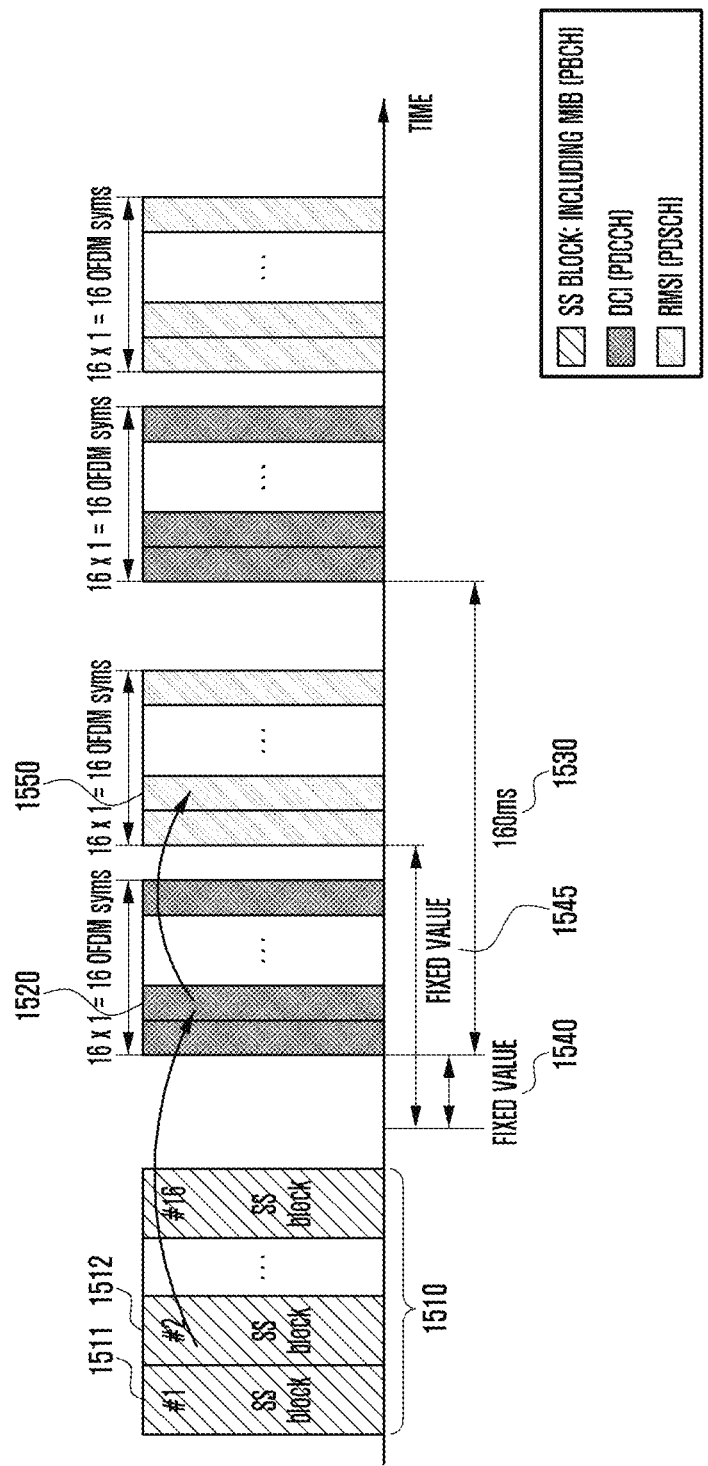
FIG. 15 is a diagram illustrating a configuration of an SS burst set, RMSI-related CORESET, and PDSCH according to an embodiment of the present disclosure.

FIG. 15 is a diagram illustrating a configuration of an SS burst set, RMSI-related CORESET, and PDSCH according to an embodiment of the present disclosure.

In reference to FIG. 15, the SS burst set 1510 may consist of 16 SS blocks.

The terminal may locate the starting point of the frame carrying the SS burst sets upon receipt of an SS block (based on PBCH or TSS in the SS block) and, if the standard specifies that the RMSI-related CORESET(s) transmission position is fixed ("fixed value" 1540 in FIG. 15), analogizes the starting point of the RMSI-related CORESET(s) from the starting point of the corresponding frame.

If the position of the CORESET is fixed, the starting point of the CORESET may be fixed at an absolute position or determined based on an offset from the starting point of the frame carrying the SS burst set. If the starting point of the CORESET is fixed, an indicator indicating the starting time point of the CORESET may be transmitted to the terminal in the MIB or DCI.

For example, if the starting point of the CORESET is fixed at an absolute position, the system frame index, subframe index, slot index, and symbol index may be predetermined. It may also be possible that an offset from the starting point of the frame carrying the SS burst set is predetermined.

A parameter indicating the number of SS blocks constituting an SS burst set may be set to 16 in the MIB such that the terminal may determine that the corresponding system is a multibeam-based system based on this information.

It may be possible that the QCL information or QCL parameter (QCL between the PSS/SSS PBCH DMRS in the SS block and RMSI-related PDCCH DMRS in this embodiment) is set to ON (i.e., Quasi-colocation exists).

It may also be possible that a mini-slot carrying only one search space or CORESET consists of 1 OFDM symbol. The terminal may analogize the position of the search space or CORESET based on the beam on which the terminal has received the SS block (including PBCH). This is because the base station Tx beam for transmitting a specific SS block is identical with the beam for transmitting the corresponding search space or CORESET in a situation where QCL is configured.

In reference to FIG. 15, if the terminal receives the second SS block 1512 in the SS burst set, it may receive the DCI in the second CORESET. Because one mini-slot consists of 1 OFDM symbol, the terminal may receive the DCI including the RMSI scheduling information transmitted at the mini-slot 1520 including the second RMSI-related search space or CORESET counted from the starting time point of the mini-slot carrying the RMSI-related search space or CORESET (based on the QCL relationship).

If the network-configured SS burst set periodicity is 40 ms and the RMSI-related CORESET(s) periodicity $L_{PDCCH}$ is set to 1 under the assumption that the transmission of the same PBCH is provided for 4 consecutive SS burst sets in the standard, the transmission periodicity becomes 160 ms (=40 ms×4×1), as denoted by reference number 1530, based on the RMSI-related CORESET(s)/PDSCH starting point.

By referencing the content of the DCI transmitted in the second mini-slot 1520, it may be possible that the mini-slot carrying PDSCH consists of 1 OFDM symbol. However, the above information may be included in the MIB.

Because the QCL information or QCL parameter is set to ON in the MIB, the terminal may analogize the position for receiving the PDCCH based on the beam on which the terminal has received the SS block (or beam on which the terminal has received the search space/CORESET).

In reference to FIG. 15, if the terminal has received the second SS block 1512 in the SS burst set, it may be possible to receive PDSCH in the second PDSCH mini-slot 1550 counted from the starting time point of the RMSI Tx PDSCH mini-slot (based on the QCL relationship).

Here, the RMSI-related PDSCH starting point may be fixed like that of the CORESET. In reference to FIG. 15, the RMSI-related PDSCH starting point may be set to a fixed value as denoted by reference number 1545 such that the terminal may locate the RMSI-related PDSCH starting point based on the starting point of the frame carrying the SS burst set. If the PDSCH starting point is fixed, an indicator indicating the fixed PDSCH starting time point may be transmitted to the terminal in the MIB or DCI.

If the position of the PDSCH is fixed, the PDSCH starting point may be fixed at an absolute position or determined based on the offset from the starting point of the frame carrying the SS burst set.

For example, if the PDSCH starting point is fixed at an absolute position, the system frame index, subframe index, slot index, and symbol index may be predetermined, or part of the information may be transmitted to the terminal in the MIB or DCI, as described above. It may also be possible that an offset from the starting point of the frame carrying the SS burst set is preconfigured in the terminal or transmitted to the terminal in the MIB or DCI.

It may also be possible to receive the RMSI Tx PDSCH in the resource scheduled via the corresponding PDCCH. That is, the information on the resource scheduled via the PDCCH may include the information on the resource for use in transmitting RMSI or data such that the terminal may receive the RMSI or data on the PDSCH based on the above information.

If the network-configured SS burst set periodicity is 40 ms and the RMSI-related CORESET(s) periodicity $L_{PDCCH}$ is set to 1 under the assumption that the transmission of the same PBCH is provided for 4 consecutive SS burst sets in the standard, the transmission periodicity becomes 160 ms (=40 ms×4×1) based on the RMSI Tx PDSCH mini-slot starting point.

However, part of the above information may be transmitted in the DCI. Although the description has been made with specific kinds of information, various other kinds of information may be configured in the MIB and DCI.

Figure 16:
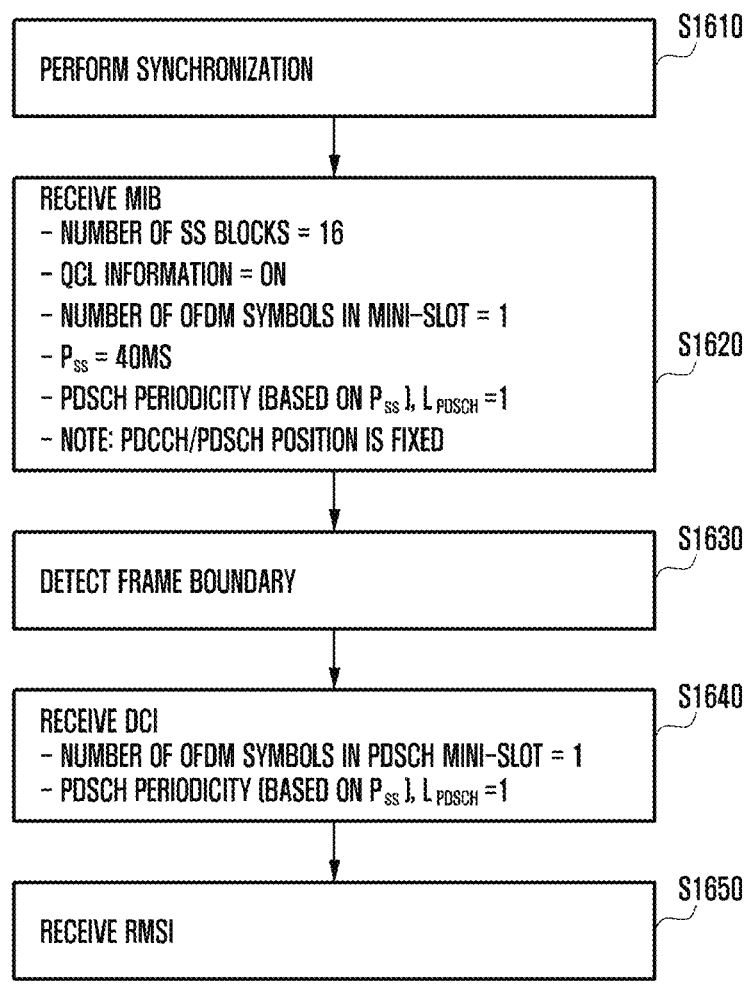
FIG. 16 is a flowchart illustrating an operation of a terminal according to an embodiment of the present disclosure.

FIG. 16 is a flowchart illustrating an operation of a terminal according to an embodiment of the present disclosure.

In reference to FIG. 16, the terminal may perform synchronization at step S1610. The synchronization may be performed based on the PSS and SSS received from a base station.

Next, the terminal may receive the MIB through a PBCH at step S1620. The terminal may obtain the CORESET information from the MIB and receive RMSI scheduling information (DCI) in the CORESET.

Here, the number of SS blocks constituting the SS burst set may be set to 16 in the MIB and, on the basis of this information, the terminal may determine that the corresponding system is a multibeam-based system.

The MIB may include QCL information or a QCL parameter set to ON.

It may be possible that the number of OFDM symbols constituting one mini-slot is set to 1. In this case, the terminal may analogize the position of a search space or CORESET for receiving signals immediately based on the beam on which the SS block (including PBCH) is received. The detailed description thereof has been described above and thus is omitted herein.

It may be possible that the SS burst set periodicity is set to 40 ms and the RMSI-related CORESET(s)/PDSCH periodicity L is set to 1 in the MIB. Because the same content can be transmitted for 4 consecutive SS burst sets in the standard, the terminal may assume that the transmission periodicity is 160 ms (=40 ms×4×1) based on the RMSI-related CORESET(s)/PDSCH starting point.

The MIB may also include the information indicating that a PDCCH or PDSCH position is fixed.

At step S1630, the terminal may detect the frame boundary based on the information contained in the MIB. That is, the terminal may locate a radio frame starting point based on the information carried in the MIB. The terminal may obtain the information on the CORESET position and CORESET periodicity based on the PBCH or TSS.

The terminal may receive the DCI at step S1640. In detail, the terminal may receive the DCI for scheduling RMSI at the identified CORESET position.

The terminal may acquire the information indicating that the mini-slot carrying the PDSCH consists of 1 OFDM symbol based on the information contained in the DCI and analogize the PDSCH position immediately. However, the above information may also be included in the MIB. The detailed description thereof has been made above and thus is omitted herein.

The PDSCH position may be fixed as described above.

Next, the terminal may receive the RMSI at step S1650. That is, the terminal may receive the RMSI in the PDSCH resources indicated by the DCI.

Figure 17:
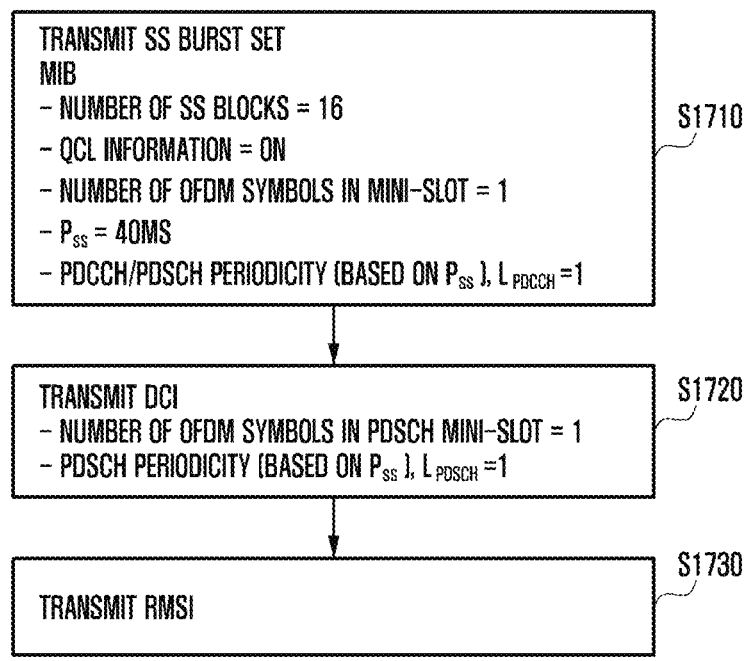
FIG. 17 is a flowchart illustrating an operation of a base station according to an embodiment of the present disclosure.

FIG. 17 is a flowchart illustrating an operation of a base station according to an embodiment of the present disclosure.

In reference to FIG. 17, the base station may transmit an SS burst set at step S1710. The SS burst set may include the PSS, SSS, TSS, and MIB.

The MIB may also include the information on CORESETs, and the base station may send the terminal the RMSI scheduling information (DCI) in the CORESETs.

The detailed description of the information being included in the MIB has been made above with reference to FIG. 16 and thus is omitted herein.

Next, the base station may transmit the DCI at step S1720. In detail, the base station may transmit the DCI including the RMSI scheduling information at the designated CORESET position.

Then, the base station may transmit the RMSI at step S1730. The base station may transmit the RMSI in the PDSCH resources indicated by the RMSI scheduling information.

An embodiment is directed to a case where the CORESET(s) and PDSCH periodicities are determined based on the default SS periodicity (20 ms) assumed by the terminal in an initial access attempt to a cell. In this embodiment, there is no need for the terminal to perform blind decoding to receive the RMSI-related CORESET(s) and PDSCH. That is, the description is made of the case where the QCL information is set to ON. Here, the QCL information is a 1-bit indicator set to ON.

It may also be possible to use QCL mapping information instead of the QCL information and, if the QCL mapping information is configured, the terminal assumes that QCL exists. In this embodiment, there is a QCL relationship between the PSS/SSS or PBCH DMRS in an SS block and the PDCCH DMRS, and the QCL mapping information is 1:1.

In this embodiment, the search spaces or CORESETs consist of 1 OFDM symbol each and are transmitted by two, i.e., consecutive search spaces or CORESETs, at an interval of 2 OFDM symbols.

Figure 18:
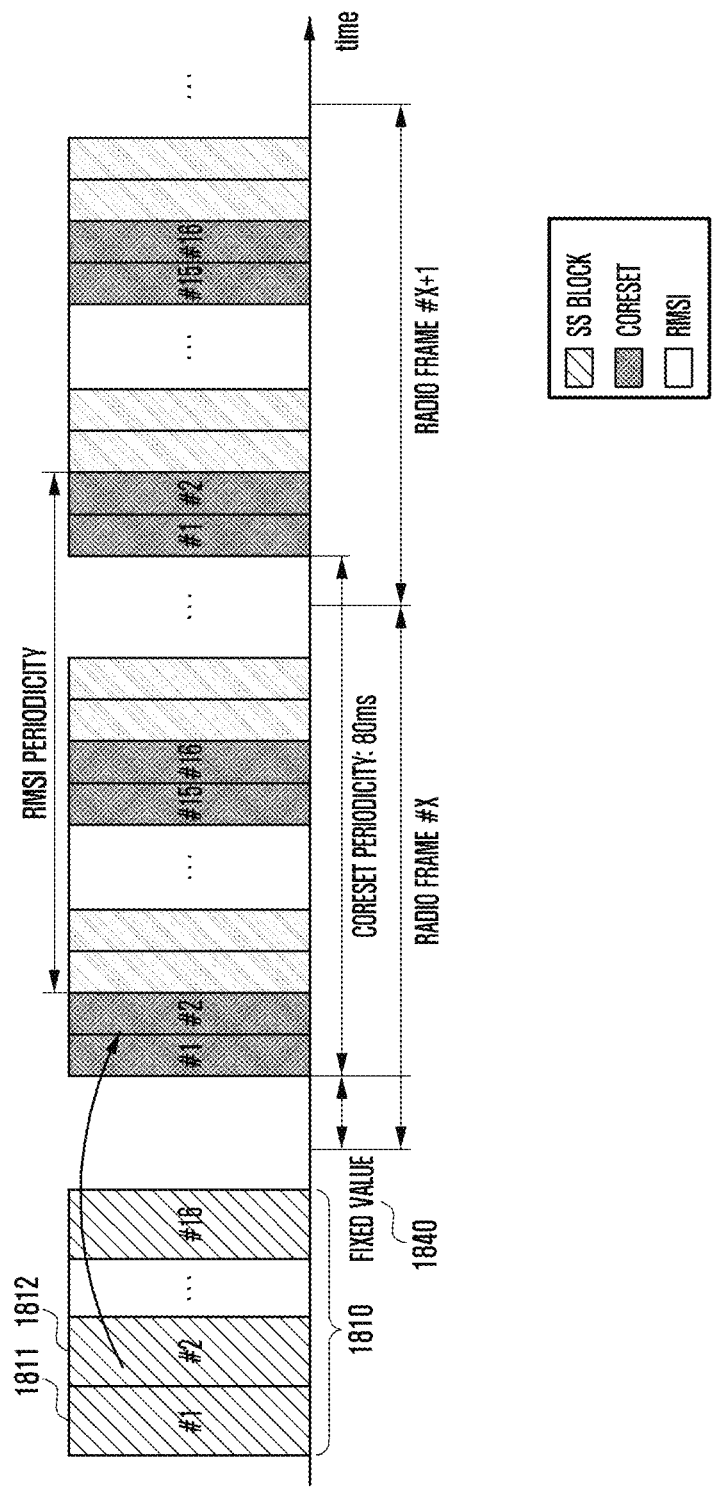
FIG. 18 is a diagram illustrating a resource configuration for transmitting SS burst sets, RMSI-related CORESETs, and PDSCH according to an embodiment of the present disclosure.

FIG. 18 is a diagram illustrating a resource configuration for transmitting SS burst sets, RMSI-related CORESETs, and PDSCH according to an embodiment of the present disclosure.

In reference to FIG. 18, an SS burst set 1810 may consists of 16 SS blocks.

The terminal may locate the starting point of the frame carrying the SS burst sets upon receipt of an SS block (based on the PBCH or TSS in the SS block) and, if the standard specifies that the RMSI-related CORESET(s) transmission position is fixed ("fixed value" 1840 in FIG. 18), analogizes the starting point of the RMSI-related CORESET(s) from the starting point of the corresponding frame. If the position of the CORESET is fixed, the starting point of the CORESET may be fixed at an absolute position or determined based on an offset from the starting point of the frame carrying the SS burst set.

For example, if the starting point of the CORESET is fixed at an absolute position, the system frame index, subframe index, slot index, and symbol index may be predetermined, or part of the information may be transmitted to the terminal in the MIB or DCI. It may also be possible that an offset from the starting point of the frame carrying the SS burst set is preconfigured in the terminal or transmitted to the terminal in the MIB or DCI.

In this case, a parameter indicating the number of SS blocks constituting an SS burst set may be set to 16 in the MIB, and the terminal may determine that the corresponding system is a multibeam-based system based on this information.

It may be possible that QCL mapping information (QCL between the PBCH DMRS in the SS block and the PDCCH DMRS in the search space or CORESET) may be configured to indicate 1:1. The QCL mapping information may be set to one of a few values specified in the standard. For example, if four candidate values of 1:1, 2:1, 6:1, and 8:1 is predesignated, 2-bit QCL mapping information may be configured in the MIB.

The mapping information (time position information) for the CORESETs or search spaces in the CORESET that is determined on the basis of the CORESET starting time point may include information indicating how many consecutive CORESETs or search spaces are transmitted and information indicating the interval between consecutive CORESETs or search spaces.

Each CORESET or search space may consist of 1 OFDM symbol, and the terminal may analogize the position of the CORESET or search space for receiving signals based on the beam on which the terminal has received an SS block (including PBCH). This is because the base station Tx beam for transmitting a specific SS block is identical with the beam for transmitting the corresponding search space or CORESET in a situation where QCL is configured and the QCL mapping relationship is 1:1.

In reference to FIG. 18, if the terminal receives the second SS block 1812 in the SS burst set, it may receive the DCI in the second CORESET or service space. Because one minislot consists of one OFDM symbol, the terminal may receive the DCI including the RMSI scheduling information transmitted in the second CORESET or search space counted from the starting time point of the RMSI-related CORESET transmission (based on QCL).

Because the SS periodicity assumed by the terminal in initial access is 20 ms, if the RMSI-related CORESET(s) periodicity $L_{PDCCH}$ is set to 1, the transmission periodicity becomes 80 ms based on the RMSI-related CORESET starting point. The terminal performs RMSI decoding at the resource position scheduled via the RMSI-related CORESET.

However, part of the above information may be transmitted in the DCI. Although the description has been made with specific kinds of information, various other kinds of information may be configured in the MIB and DCI FIG. 19 is a flowchart illustrating an operation of a terminal according to an embodiment of the present disclosure.

Figure 19:
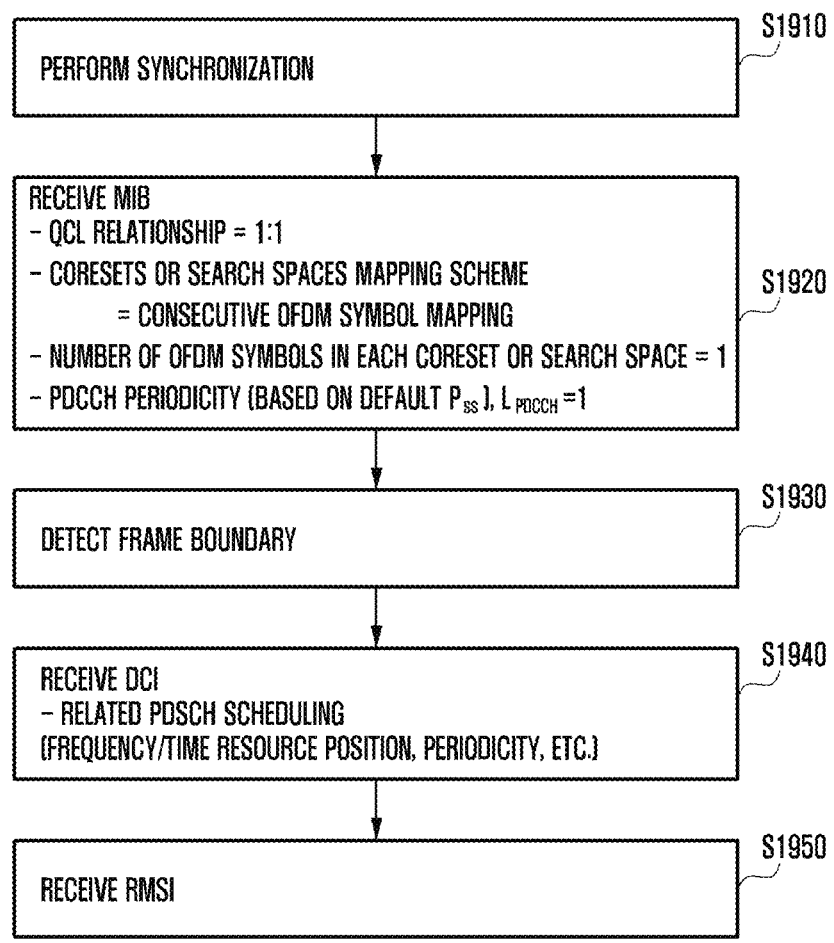
FIG. 19 is a flowchart illustrating an operation of a terminal according to an embodiment of the present disclosure.

In reference to FIG. 19, the terminal may perform synchronization at step S1910. The synchronization may be performed based on the PSS and SSS received from a base station.

Next, the terminal may receive the MIB through a PBCH at step S1920. The terminal may obtain the CORESET information from the MIB and receive RMSI scheduling information (DCI) in the CORESET.

Here, the number of SS blocks constituting the SS burst set may be set to 16 in the MIB and, on the basis of this information, the terminal may determine that the corresponding system is a multibeam-based system.

A QCL relationship may be set to 1:1 in the MIB. This information may be provided with a predetermined number of bits.

The MIB may include time domain mapping information (time position information) of CORESETs or search spaces in the CORESETs that is determined on the basis of the CORESET starting time point, and the time position information may mean the information indicating the number of CORESETs or search spaces being consecutively transmitted or the information indicating the interval between consecutive CORESETs or search spaces.

A mini-slot may consist of 1 OFDM symbol. The terminal may analogize the position of the search space or CORESET for receiving signals based on the beam on which the terminal has received an SS block (including PBCH). The detailed description thereof has been made above and thus is omitted herein.

Because the SS periodicity assumed by the terminal in initial access is 20 ms, if the RMSI-related CORESET(s) periodicity $L_{PDCCH}$ is set to 1, the transmission periodicity becomes 80 ms based on the RMSI-related CORESET starting point. The terminal performs RMSI decoding at the resource position scheduled via the RMSI-related CORESET.

However, part of the above information may be transmitted in the DCI. Although the description has been made with specific kinds of information, various other kinds of information may be configured in the MIB and DCI At step S1930, the terminal may detect the frame boundary based on the information contained in the MIB. That is, the terminal may locate a radio frame starting point based on the information carried in the MIB. The terminal may obtain the information on the CORESET position and CORESET periodicity based on the PBCH or TSS.

The terminal may receive the DCI at step S1940. In detail, the terminal may receive the DCI for scheduling RMSI at the identified CORESET position. The DCI may include the PDSCH resource position and periodicity for transmitting the RMSI.

Next, the terminal may receive the RMSI at step S1950. That is, the terminal may receive the RMSI in the PDSCH resources identified based on the DCI.

Figure 20:
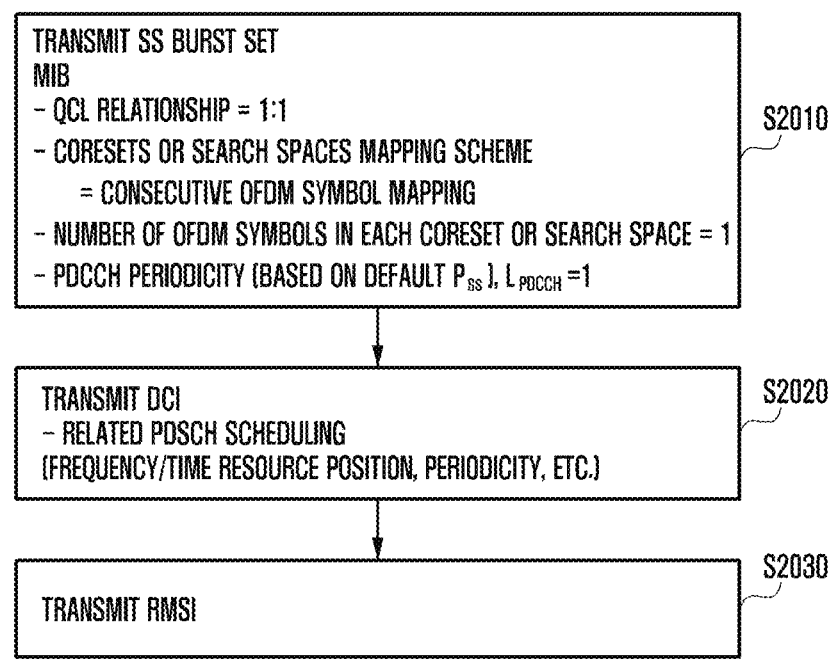
FIG. 20 is a flowchart illustrating an operation of a base station according to an embodiment of the present disclosure.

FIG. 20 is a flowchart illustrating an operation of a base station according to an embodiment of the present disclosure.

In reference to FIG. 20, the base station may transmit an SS burst set at step S2010. The SS burst set may include the PSS, SSS, TSS, and MIB.

The MIB may also include the information on CORESETs, and the base station may send the terminal the RMSI scheduling information (DCI) in the CORESETs.

The detailed description of the information being included in the MIB has been made above with reference to FIG. 19 and thus is omitted herein.

Next, the base station may transmit the DCI at step S2020. In detail, the base station may transmit the DCI including the RMSI scheduling information at the designated CORESET position.

Then, the base station may transmit the RMSI at step S2030. The base station may transmit the RMSI in the PDSCH resources indicated by the RMSI scheduling information.

Hereinafter. a description is made of the DMRS pattern configuration method according to an embodiment of the present disclosure.

Before a terminal camps on a cell (RRC CONN), the base station may configure a default DMRS pattern via the MIB, RMSI, or MIB and RMSI. This pattern may be configured per physical channel, such as physical channels including uplink and downlink physical channels between a base station and a terminal. It may also be possible to configure different patterns in downlink (DL) and uplink (UL) channels.

For example, the base station may configure a default DMRS pattern to the terminal per service or deployment scenario. For example, it may be possible to configure a DMRS pattern dense in view of time density to the terminal for a cell deployed near an expressway. Before establishing a connection to the base station (entering RRC CONN state), the terminal attempts data decoding on a DL channel or transmits data on a UL channel according to the default pattern configured by the base station.

After entering the connected state (RRC CON), the terminal may update, if necessary, the DMRS pattern through UE-specific RRC signaling. It may also be possible to configure a set of DMRS patterns through RRC signaling and, if necessary, transmit a value of the DMRS pattern selected from the DMRS pattern set via the DCI or medium access control-control element (MAC-CE) to configure the selected DMRS pattern.

The UE-specific DMRS pattern configuration may be performed via UE-specific RRC signaling or DCI in a terminal feedback-based manner. For example, terminals may perform channel measurement and transmit feedback information such as frequency-selectivity characteristics and Doppler characteristics of the channel, and the base station may assign a DMRS pattern with a high frequency domain density to the terminal with a high frequency selectivity and a DMRS pattern with a high time domain density to the terminal with a high Doppler characteristic. In a hybrid automatic repeat request (HARD) process, the base station may select a DMRS pattern with a high frequency domain and/or time domain density from the DMRS pattern set and assign the selected DMRS pattern to the terminal according to the number of retransmissions. It may also be possible for the terminal to change the DMRS pattern for a new one with a high frequency or time domain density for UL transmission autonomously according to the number of retransmissions.

Figure 21:
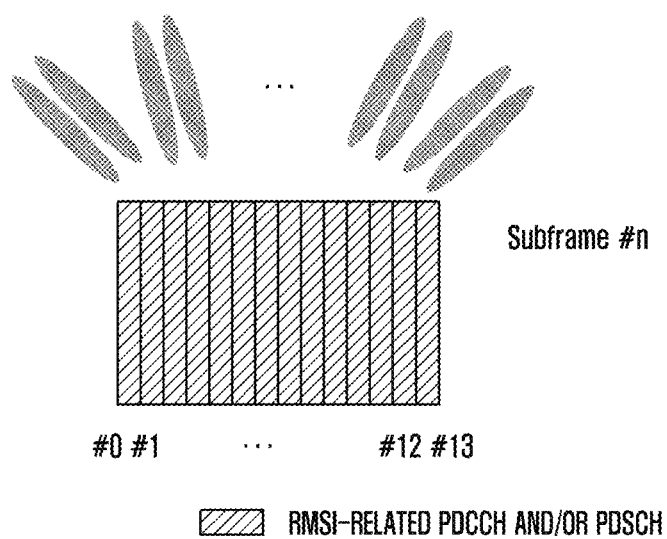
FIG. 21 is a diagram illustrating a configuration of mini-slots consisting of 2 OFDM symbols each.

Hereinafter, a description is made of the reference signal design method. FIG. 21 is a diagram illustrating a configuration of mini-slots consisting of 2 OFDM symbols each.

In reference to FIG. 21, a mini-slot may consist of OFDM symbol #1 and OFDM symbol #2. In this case, it may be possible to transmit and receive data on two different directional beams per mini-slot. It may also be possible to use the same directional beam for the OFDM symbols of the same mini-slot.

Figure 22:
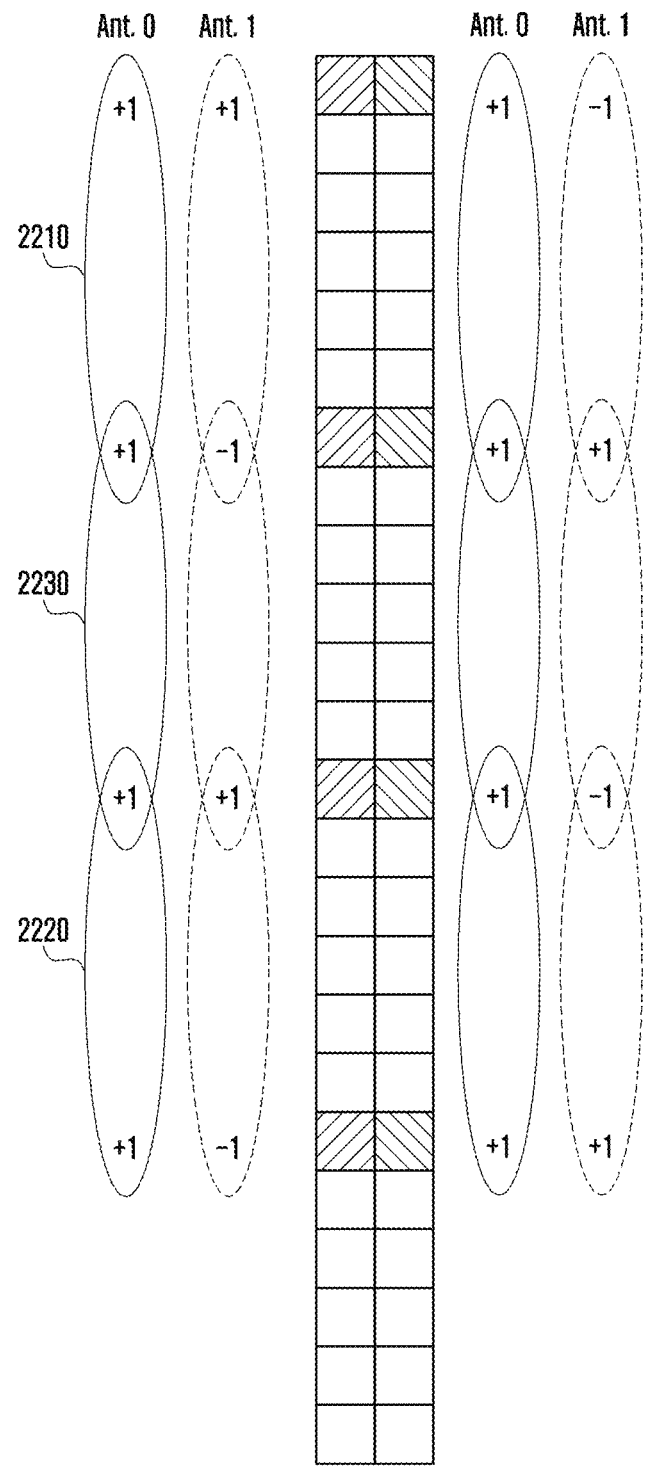
FIG. 22 is a diagram illustrating a method for designing reference signals mapped to two OFDM symbols in the frequency domain according to an embodiment of the present disclosure.
Figure 23:
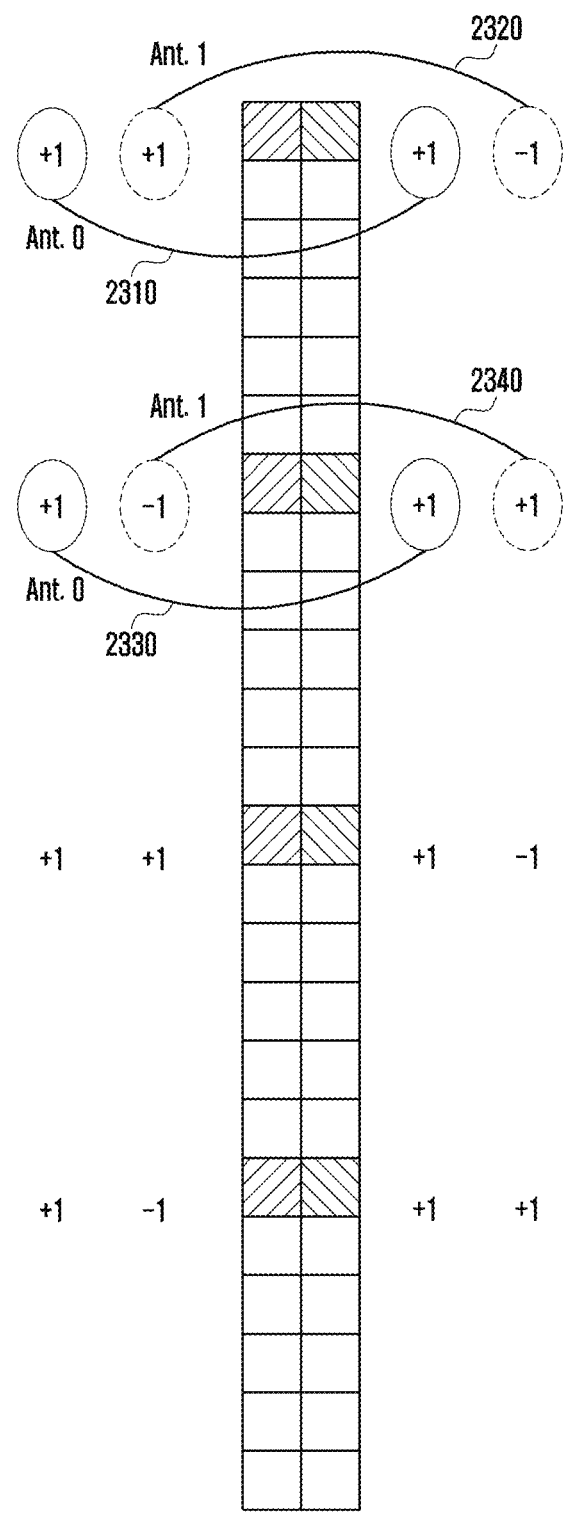
FIG. 23 is a diagram illustrating a method for designing reference signals mapped to two OFDM symbols in the time domain.

FIGS. 22 and 23 are diagrams for explaining a reference signal design method according to an embodiment of the present disclosure.

FIGS. 22 and 23 show reference signal (RS) designs for the case where an RMSI-related PDCCH, RMSI-related PDCCH/PDSCH, or RMSI Tx PDSCH is transmitted in two consecutive OFDM symbols (same beam is used in the OFDM symbols constituting a mini-slot). FIGS. 22 and 23 show the same reference signal design method and show how to design the reference signal in the frequency and time domains.

In the case that a mini-slot is transmitted on a beam, it may be possible to design and map orthogonal cover code (OCC) patterns for OCC processing in the frequency and time domains as shown in FIGS. 22 and 23.

That is, the OCC corresponding to the second antenna port is applied differently depending on whether the OFDM symbol position is an even index OFDM symbol position or an odd index OFDM symbol position. A description is made of the OCC mapping with reference to FIG. 24.

FIG. 24 is a diagram illustrating a table with OCC mapping per antenna port.

In reference to FIG. 24, the OCC mapping is performed differently according to the odd index OFDM symbol, even index OFDM symbol, and antenna port. Although various mappings are shown in FIG. 24, the mappings may be changed in various manners without breaking the orthogonality.

In FIGS. 22 and 23, each smallest square block denotes an RE, the vertical axis denotes subcarriers, and the horizontal axis denotes OFDM symbols. The shaded REs are REs to which a reference signal is mapped.

The frequency domain length 2-OCC processing may be performed as shown in FIG. 22. In FIG. 22, four subcarriers are used for reference signal transmission.

In this case, the length 2-OCC processing is performed by the two subcarriers such that it is possible to process the reference signals with at least two length 2-OCCs and up to three length 2-OCCs.

In the case of using two length 2-OCCs, the reference signals on the first and second reference signal subcarriers from the top are processed with one length 2-OCC 2210, and the reference signals on the third and fourth reference signal subcarriers from the top are processed with the other length 2-OCC 2220. In the case of using three length 2-OCCs, the reference signals on the second and third reference signal subcarriers are processed with an additional length 2-OCC 2230.

In the case of the time domain length 2-OCC processing of FIG. 23, it may be possible to apply the length 2-OCCs to the reference signals mapped to the two consecutive OFDM symbols on the reference signal subcarriers. In reference to FIG. 23. OCC=[+1 +1] is applied to the first RE pair for Ant. Port 0 as denoted by reference number 2310, and OCC=[+1 −1] is applied to the first RE pair for Ant. Port 1 as denoted by reference number 2320. Likewise, OCC=[+1 +1] is applied to the second RE pair for Ant. Port 0 as denoted by reference number 2330, and OCC=[+1 −1] is applied to the second RE pair for Ant. Port 1 as denoted by reference number 2340. In the two-port space frequency block code-based (SFBC-based) beam sweeping broadcast according to a representative embodiment of the present disclosure, the channel estimation on two antenna ports may be performed as described above. The signal reception algorithm may be designed to perform channel estimation by taking into consideration the frequency domain and time domain processing aspects selectively or in combination. The present disclosure is not limited to the RMSI-related PDCCH and/or PDSCH transmission, and it may be applicable to any type of signal transmission that allows for application of a time/frequency domain OCC to all the types of physical (PHY) channels for transmitting information in two or more consecutive OFDM symbols using a beam directly or in an extended or modified manner. The OCC values may be changed if the change does not break the mutual orthogonality. It may be possible to increase the length of the OCC as the number of OFDM symbols for transmitting a signal on the same beam increases.

As described above, in the case of transmitting data or control information in the same beam direction for a predetermined number of OFDM symbols, it may possible to apply an OCC to the RSs for channel estimation on a plurality of antenna ports in the corresponding area. The terminal may perform channel estimation using the RS transmitted at predetermined OFDM symbols in the same beam direction.

Although not described, it may be possible to design a tracking reference signal (TRS) being configured in the MIB for transmitting the RMSI-related PDCCH and/or PDSCH and use the TRS instead of any independent reference signal. The TRS may be a reference signal for measuring a time/frequency offset continuously, a reference signal for beam management (e.g. base station Tx beam/terminal Rx beam pair determination), a reference signal for L3 mobility, or a reference signal for any combination of the aforementioned functionalities.

Figure 25:
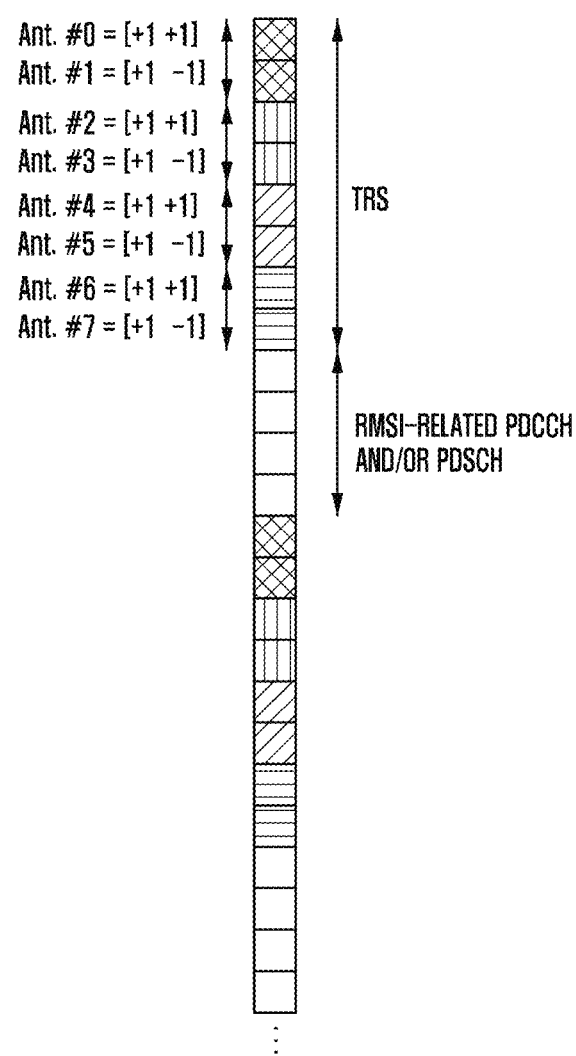
FIG. 25 is a diagram illustrating a design of TRS frequency-division-multiplexed (FDMed) with RMSI-related PDCCH and/or PDSCH for TRS-based channel estimation according to an embodiment of the present disclosure.

FIG. 25 is a diagram illustrating a design of TRS frequency-division-multiplexed (FDMed) with RMSI-related PDCCH or PDSCH for TRS-based channel estimation according to an embodiment of the present disclosure.

A description is made of the method for designing a TRS FDMed with a beam reference signal (BRS) and RMSI-related PDCCH or PDSCH in an OFDM symbol for use of the TRS in RMSI-related PDSCH or PDSCH channel estimation with reference to FIG. 25.

In FIG. 25, a square block denotes an RE, and the TRS and RMSI-related PDCCH and/or PDSCH are FDMed by the 12 subcarriers. FIG. 25 is depicted under the assumption that the number of antenna ports is 8, but the present disclosure is not limited to this embodiment.

As shown in FIG. 25, the present disclosure proposes a TRS design method of binding TRSs being transmitted through 8 antenna ports in pairs and applying length-2 OCCs to each pair for separating the TRSs. In the 2-port SFBC-based beaming sweeping broadcast, per-port channel estimations may be accomplished by performing OCC decoding by the two subcarriers.

In a case of the 2-port SFBC for transmitting the RMSI-PDCCH or PDSCH through one port or beam formed with Ant. Ports #0, #2, #4, and #6 and the other port or beam formed with Ant. Port #1, #3, #5, and #7, a terminal may perform TRS-based per-port channel estimation and estimate channels for the two ports of the RMSI-related PDCCH and/or PDSCH based on the TRS-based per-port channel estimation result.

Figure 26:
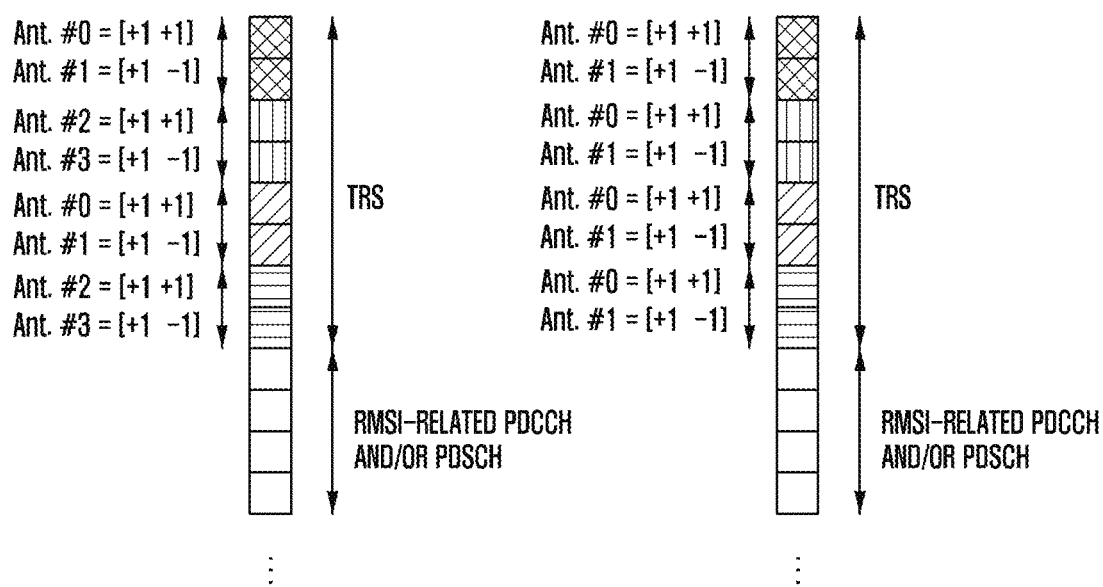
FIG. 26 is a diagram illustrating a design of BRS for channel estimation based on TRS FDMed with RMSI-related PDCCH and/or PDSCH according to a number of antenna ports.

FIG. 26 is a diagram illustrating a design of a BRS for channel estimation based on a TRS FDMed with the RMSI-related PDCCH or PDSCH according to a number of antenna ports.

FIG. 26 exemplifies TRS transmission for a case where the number of TRS transmission antenna ports is less than 8, i.e., 2 or 4.

In a situation where a terminal does not know the number of antenna ports for TRS transmission before decoding the RMSI-related PDCCH or PDSCH and thus has to perform blind decoding, the terminal can estimate a channel value corresponding to an antenna port for RMSI-related PDCCH or PDSCH based on the channel values by the two subcarriers to which one OCC has been applied and then the other channel value corresponding to the other antenna port for RMSI-related PDCCH or PDSCH based on the channel values by the two subcarriers to which the other OCC has been applied.

The designs of FIGS. 25 and 26 may be applied to a case where a mini-slot consists of one or more OFDM symbols.

Figure 27:
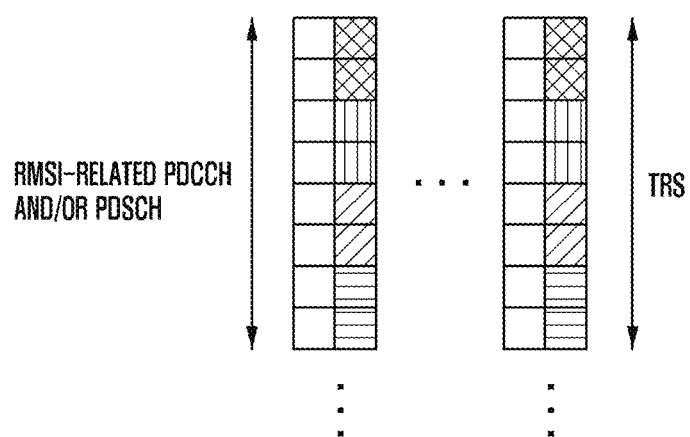
FIG. 27 is a diagram illustrating design of TRS TDMed with RMSI-related PDCCH and/or PDSCH for TRS-based channel estimation according to an embodiment of the present disclosure.

A description is made of the method for designing a TRS time division-multiplexed (TDMed) with RMSI-related PDCCH and/or PDSCH in the case where a mini-slot consists of two OFDM symbols with reference to FIG. 27.

FIG. 27 is a diagram illustrating a design of a TRS TDMed with RMSI-related PDCCH or PDSCH for TRS-based channel estimation according to an embodiment of the present disclosure.

The TRS may be designed in the same manner as described with reference to FIG. 25 or 26. Assuming that there is little channel variation and the same beam is applied during a predetermined number of consecutive OFDM symbols, it is possible to use the TRS-based channel estimation result to decode RMSI-related PDCCH or PDSCH decoding.

The present disclosure is not limited to the RMSI-related PDCCH and/or PDSCH transmission, and it may be applicable to any type of channel estimation with signals separated by OCC using the characteristic of transmitting FDMed or TDMed reference signals and channel on the same directional beam. The OCC values may be changed if the change does not break the mutual orthogonality. It may be possible to increase the length of the OCC as the number of OFDM symbols for transmitting a signal on the same beam increases. It may also be possible to increase the OCC length according to the mapping the reference signals on subcarriers in a symbol and a broadcast channel.

Although the descriptions are directed to reference signal designs, for a case where the RMSI-related PDCCH or PDSCH is transmitted in 2-port diversity mode (i.e., 2 port SFBC), to differentiate two ports with OCC in each frequency resource and estimate per-port channels of the RMSI-related PDCCH or PDSCH based on the channel values estimated with the same OCC in each frequency resource, the present disclosure may include embodiments in which the RMSI-related PDCCH or PDSCH is transmitted in 4-port diversity mode (i.e., 4 port SFBC) to differentiate four antenna ports with OCC in each frequency resource and estimate per-port channels of the RMSI-related PDCCH or PDSCH based on the channel values estimated with the same OCC in each frequency resource.

Figure 28:
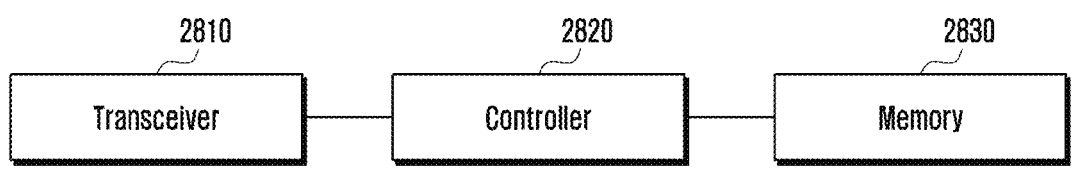
FIG. 28 is a block diagram illustrating a configuration of a terminal according to an embodiment of the present disclosure.

FIG. 28 is a block diagram illustrating a configuration of a terminal according to an embodiment of the present disclosure.

As shown in FIG. 28, the terminal may include a transceiver 2810, a controller 2820, and a memory 2830. In the present disclosure, the controller may be a circuit, an application-specific integrated circuit, or at least one processor. The processor may be controlled by a program including instructions for executing a method according to an embodiment of the present disclosure. The program may be stored in a storage medium, and examples of the storage medium include volatile and non-volatile memories. The memories may be media that are capable of data and, if configured to store the instructions, may not be limited in type.

The transceiver 2810 may transmit and receive signals to and from other network entities. For example, the transceiver 2810 may receive system information, synchronization signals, and reference signals from a base station.

The controller 2820 may control overall operations of the terminal as proposed in the present disclosure. In detail, the controller 2820 may control the operations for receiving RMSI in a multibeam-based system as proposed in the present disclosure.

The memory 2830 may store at least one type of information being transmitted and received by the transceiver 2810 and generated by the controller 2820. For example, the memory 2830 may store RMSI transmission-related scheduling information and RMSI-related PDCCH time domain position and periodicity information.

Figure 29:
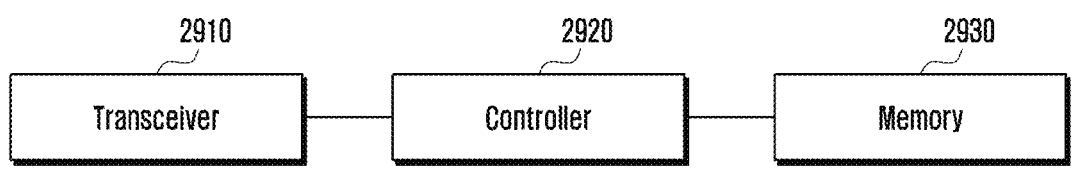
FIG. 29 is a block diagram illustrating a configuration of a base station according to an embodiment of the present disclosure.

FIG. 29 is a block diagram illustrating a configuration of a base station according to an embodiment of the present disclosure.

As shown in FIG. 29, the base station may include a transceiver 2910, a controller 2920, and a memory 2930. In the present disclosure, the controller may be a circuit, an application-specific integrated circuit, or at least one processor. The processor may be controlled by a program including instructions for executing a method according to an embodiment of the present disclosure. The program may be stored in a storage medium, and examples of the storage medium include volatile and non-volatile memories. The memories may be media that are capable of storing data and, if configured to store the instructions, may not be limited in type.

The transceiver 2910 may transmit and receive signals to and from other network entities. For example, the transceiver 2910 may transmit system information, synchronization signals, and reference signals to a base station.

The controller 2920 may control overall operations of the base station proposed in the present disclosure. In detail, the controller 2920 may control the operations for transmitting RMSI in the multibeam-based system as proposed in the present disclosure.

The memory 2930 may store at least one type of information being transmitted and received by the transceiver 2910 and generated by the controller 2920. For example, the memory 2930 may store RMSI transmission-related scheduling information and RMSI-related PDCCH time domain position and periodicity information.

As described above, the present disclosure is advantageous in terms of making it possible for a terminal to acquire RMSI securely by transmitting RMSI transmission scheduling information via the MIB and DCI.

The embodiments disclosed in the specification and drawings are proposed to help explain and understand the present disclosure rather than to limit the scope of the present disclosure. It is therefore intended that the following claims be interpreted to include all alterations and modification made to the disclosed embodiments as fall within the sprit and scope of the disclosure.

Meanwhile, in the drawings illustrating a method in embodiments, the order of description does not necessarily correspond to the order of execution, and the order relationship may be changed or executed in parallel.

Alternatively, the drawings illustrating the method of the disclosure may omit some of the elements and may include only some of the elements without impairing the essence of the disclosure.

Further, the method of the disclosure may be carried out in combination with some or all of the contents included in each embodiment without departing from the essence of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
    receiving, from a base station, a master information block (MIB);
    identifying, based on the MIB, information on a control resource set (CORESET) on which control information for system information is received, the information on the CORESET including information indicating a starting symbol index of the CORESET;
    receiving the control information based on the CORESET; and
    receiving, from the base station, the system information based on the control information,
    wherein the information on the CORESET further includes information indicating a number of resource blocks of the CORESET a number of symbols of the CORESET, and offset information from a starting resource block of the CORESET to a frequency associated with a synchronization signal block.

2. The method of claim 1, wherein the MIB further includes information on a subcarrier spacing for the CORESET.

3. The method of claim 1,
wherein the information on the CORESET includes quasi-colocation (QCL) information, and
wherein identifying the control information comprises identifying, in case that the QCL information is configured, the control information in the CORESET corresponding to a transmission beam on which the MIB is transmitted.

4. A method of a base station in a wireless communication system, the method comprising:
transmitting a master information block (MIB) including information on a control resource set (CORESET) on which control information for system information is transmitted, the information on CORESET including information indicating a starting symbol index of the CORESET;
transmitting the control information based on the CORESET; and
transmitting the system information based on the control information,
wherein the information on the CORESET further includes information indicating a number of resource blocks of the CORESET a number of symbols of the CORESET, and offset information from a starting resource block of the CORESET to a frequency associated with a synchronization signal block.

5. The method of claim 4, wherein the MIB further includes information on a subcarrier spacing for the CORESET.

6. The method of claim 4,
wherein the information on the CORESET includes quasi-colocation (QCL) information, and
wherein transmitting the control information comprises transmitting, in case that the QCL information is configured, the control information in the CORESET corresponding to a transmission beam on which the MIB is transmitted.

7. A terminal in a wireless communication system, the terminal comprising:
a transceiver; and
a controller configured to:
receive, via the transceiver from a base station, a master information block (MIB),
identify, based on the MIB, information on a control resource set (CORESET) on which control information for system information is received, the information on the CORESET including information indicating a starting symbol index of the CORESET,
receive, via the transceiver from the base station, the control information based on the CORESET, and
receive, via the transceiver from the base station, the system information based on the control information,
wherein the information on the CORESET further includes information indicating a number of resource blocks of the CORESET a number of symbols of the CORESET, and offset information from a starting resource block of the CORESET to a frequency associated with a synchronization signal block.

8. The terminal of claim 7, wherein the MIB further includes information on a subcarrier spacing for the CORESET.

9. The terminal of claim 7,
wherein the information on the CORESET includes quasi-colocation (QCL) information, and
wherein the controller is configured to identify, in case that the QCL information is configured, the control information in the CORESET corresponding to a transmission beam on which the MIB is transmitted.

10. A base station in a wireless communication system, the base station comprising:
a transceiver; and
a controller configured to:
transmit, via the transceiver, a master information block (MIB) including information on a control resource set (CORESET) on which control information for system information is transmitted, the information on the CORESET including information indicating a starting symbol index of the CORESET,
transmit, via the transceiver, the control information based on the CORESET, and
transmit, via the transceiver, the system information based on the control information,
wherein the information on the CORESET further includes information indicating a number of resource blocks of the CORESET a number of symbols of the CORESET, and offset information from a starting resource block of the CORESET to a frequency associated with a synchronization signal block.

11. The base station of claim 10, wherein the MIB further includes information on a subcarrier spacing for the CORESET.

12. The base station of claim 10,
wherein the information on the CORESET includes quasi-colocation (QCL) information, and
wherein the controller is configured to transmit, in case that the QCL information is configured, the control information in the CORESET corresponding to a transmission beam on which the MIB is transmitted.

* * * * *